United States Patent
Hong et al.

(10) Patent No.: US 9,567,525 B2
(45) Date of Patent: Feb. 14, 2017

(54) LIQUID CRYSTAL COMPOSITION, LIQUID CRYSTAL DISPLAY INCLUDING THE SAME AND METHOD OF MANUFACTURING THEREOF

(71) Applicant: SAMSUNG DISPLAY CO., LTD., Gyeonggi-do (KR)

(72) Inventors: Sung-Hwan Hong, Gyeonggi-do (KR); Ji Hong Bae, Gyeonggi-do (KR); Young Mi Cho, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 14/934,654

(22) Filed: Nov. 6, 2015

(65) Prior Publication Data
US 2016/0319193 A1    Nov. 3, 2016

(30) Foreign Application Priority Data

Apr. 30, 2015 (KR) ......................... 10-2015-0062102

(51) Int. Cl.
| | |
|---|---|
| C09K 19/34 | (2006.01) |
| C09K 19/44 | (2006.01) |
| G02F 1/1333 | (2006.01) |
| G02F 1/1343 | (2006.01) |
| G02F 1/1368 | (2006.01) |
| G02F 1/1362 | (2006.01) |

(52) U.S. Cl.
CPC ......... *C09K 19/3402* (2013.01); *G02F 1/1368* (2013.01); *G02F 1/13439* (2013.01); *G02F 1/133345* (2013.01); *G02F 1/134309* (2013.01); *G02F 1/136227* (2013.01); *C09K 2019/3422* (2013.01)

(58) Field of Classification Search
CPC ..... C09K 19/3402; C09K 19/44; C09K 19/56; C09K 2019/3422; G02F 1/134336; G02F 1/13439
See application file for complete search history.

(56) References Cited

U.S. PATENT DOCUMENTS

| | | | | |
|---|---|---|---|---|
| 5,858,272 | A * | 1/1999 | Haseba | C07D 319/06 252/299.01 |
| 6,902,777 | B2 * | 6/2005 | Hirschmann | C09K 19/0208 252/299.61 |
| 7,022,865 | B2 * | 4/2006 | Goulding | C09K 19/3402 252/299.61 |
| 7,314,943 | B2 * | 1/2008 | Poetsch | C07C 33/483 252/299.61 |
| 7,449,222 | B2 * | 11/2008 | Heckmeier | C09K 19/3402 252/299.61 |
| 2006/0071194 | A1 | 4/2006 | Masukawa et al. | |
| 2013/0207038 | A1 | 8/2013 | Haensel et al. | |

(Continued)

FOREIGN PATENT DOCUMENTS

| | | |
|---|---|---|
| CN | 103694214 A | 4/2014 |
| DE | 3328638 A1 | 2/1985 |

(Continued)

*Primary Examiner* — Shean C Wu
(74) *Attorney, Agent, or Firm* — Cantor Colburn, LLP

(57) ABSTRACT

A liquid crystal composition includes at least one liquid crystal molecule represented by Chemical Formulas 1-1 to 1-6, and at least one liquid crystal molecule represented by Chemical Formulas 2-1 to 2-6.

19 Claims, 4 Drawing Sheets

(56) References Cited

U.S. PATENT DOCUMENTS

2014/0084210 A1    3/2014  Yanai et al.
2016/0237350 A1*   8/2016  Saito ..................... C09K 19/20

FOREIGN PATENT DOCUMENTS

| | | |
|---|---|---|
| DE | 3447359 A1 | 7/1986 |
| DE | 19823194 A1 | 12/1998 |
| DE | 19945890 A1 | 4/2000 |
| DE | 10140419 A1 | 3/2002 |
| DE | 102004036068 A1 | 3/2005 |
| EP | 0135062 A2 | 3/1985 |
| JP | 2009215261 A | 9/2009 |
| JP | 2014062212 A | 4/2014 |
| KR | 1019950703626 A | 9/1995 |
| KR | 1020080017055 A | 2/2008 |
| WO | 9814418 A1 | 4/1998 |
| WO | 2009031437 A1 | 3/2009 |
| WO | 2014056573 A2 | 4/2014 |

\* cited by examiner

LIQUID CRYSTAL COMPOSITION, LIQUID CRYSTAL DISPLAY INCLUDING THE SAME AND METHOD OF MANUFACTURING THEREOF

This application claims priority to Korean Patent Application No. 10-2015-0062102, filed on Apr. 30, 2015, and all the benefits accruing therefrom under 35 U.S.C. §119, the content of which is hereby incorporated by reference.

BACKGROUND (a) Field

The present invention relates to a liquid crystal composition, a liquid crystal display including the same and a method of manufacturing thereof (b) Description of the Related Art A liquid crystal display ("LCD") is one of the most widely used flat panel displays at present, and includes two display panels facing each other, a liquid crystal layer interposed between two display panels, an field generating electrode such as a pixel electrode and a common electrode positioned on at least one of two display panels, and the like.

In the liquid crystal display, an electric field is generated in a liquid crystal layer by applying a voltage to the field generating electrode, such that alignment of liquid crystal molecules positioned in the liquid crystal layer may be determined and transmittance of light transmitting the liquid crystal layer may be adjusted.

The liquid crystal composition employed in the liquid crystal display significantly affects the ability to adjust the transmittance of light in order to obtain a desired image. More particularly, there has been an increased demand for a liquid crystal display which exhibits various characteristics such as low voltage driving, high voltage holding ratio ("VHR"), wide viewing angle characteristic, wide operation temperature range, high speed response, high transmittance, and the like.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a liquid crystal composition and a liquid crystal display including the same, having the advantageous properties of having a positive dielectric anisotropy and a particular chemical structure which increases a glass transition temperature and minimizes an increase in viscosity.

In an exemplary embodiment, a liquid crystal composition includes at least one liquid crystal molecule represented by Chemical Formulas 1-1 to 1-6 below, and at least one liquid crystal molecule represented by Chemical Formulas 2-1 to 2-6 below:

Chemical Formula 1-1

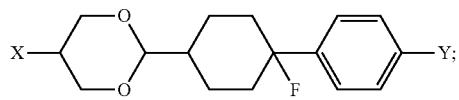

Chemical Formula 1-2

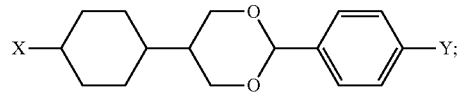

Chemical Formula 1-3

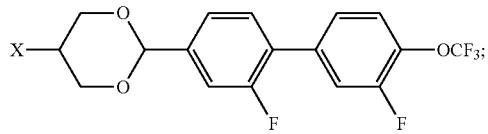

Chemical Formula 1-4

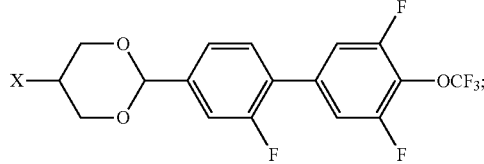

Chemical Formula 1-5

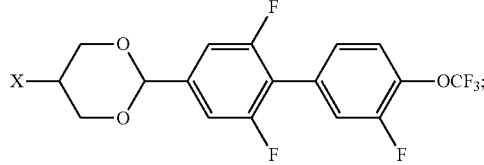

Chemical Formula 1-6

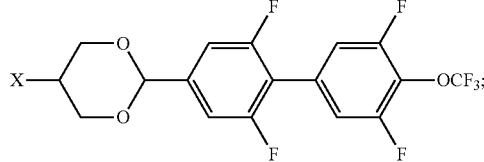

Chemical Formula 2-1

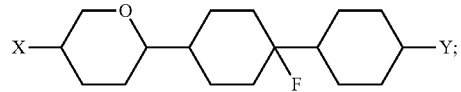

Chemical Formula 2-2

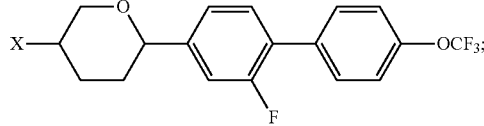

Chemical Formula 2-3

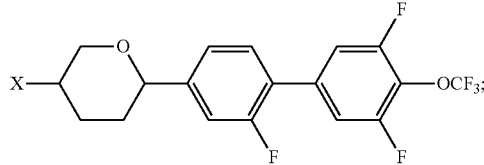

Chemical Formula 2-4

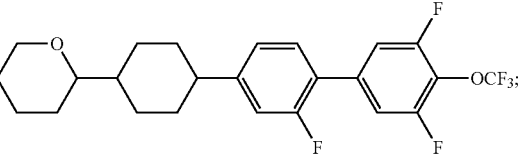

Chemical Formula 2-5

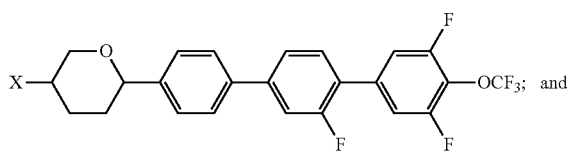

Chemical Formula 2-6

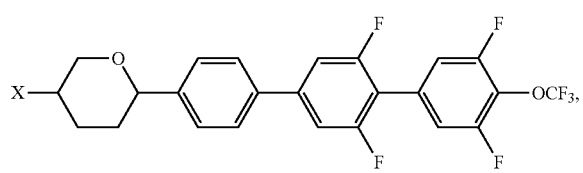

where in Chemical Formulas 1-1 to 1-6 and Chemical Formulas 2-1 to 2-6 above, X and Y are each independently a $C_1$-$C_5$ alkyl group.

In an aspect of the exemplary embodiment, the liquid crystal molecules represented by Chemical Formulas 1-1 to 1-6 and the liquid crystal molecules represented by Chemical Formulas 2-1 to 2-6 may include liquid crystal molecules represented by Chemical Formulas 1-11 to 1-16 below and liquid crystal molecules represented by Chemical Formulas 2-11 to 2-16 below, respectively:

Chemical Formula 1-11

Chemical Formula 1-12

Chemical Formula 1-13

Chemical Formula 1-14

Chemical Formula 1-15

Chemical Formula 1-16

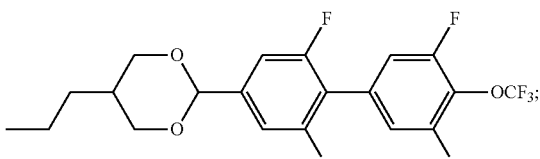

Chemical Formula 2-11

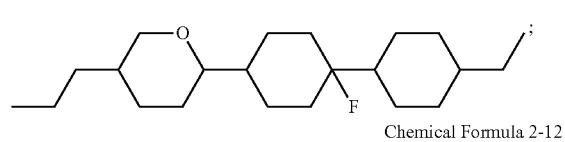

Chemical Formula 2-12

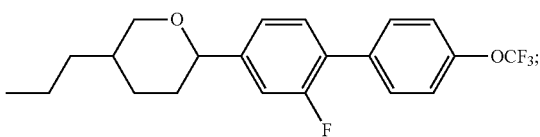

Chemical Formula 2-13

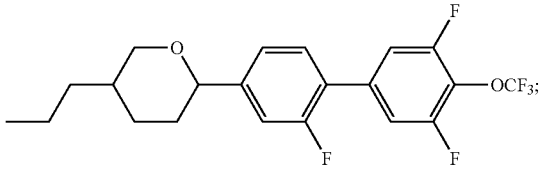

Chemical Formula 2-14

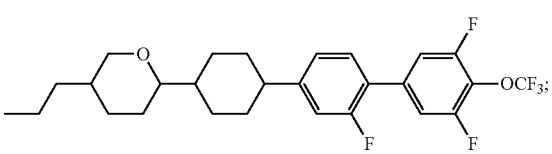

Chemical Formula 2-15

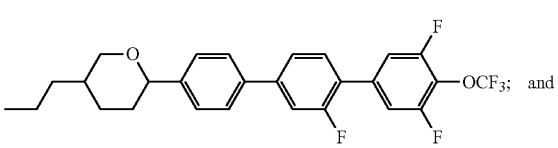

Chemical Formula 2-16

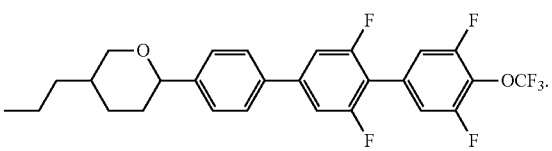

In another exemplary embodiment, the liquid crystal composition may further include at least one alkenyl-based liquid crystal molecule represented by Chemical Formulas A-1 to A-7 below:

Chemical Formula A-1

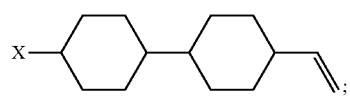

Chemical Formula A-2

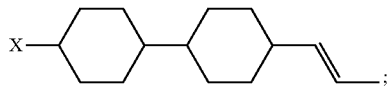

-continued

Chemical Formula A-3
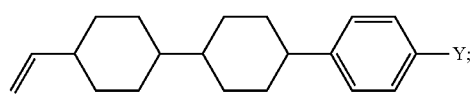

Chemical Formula A-4
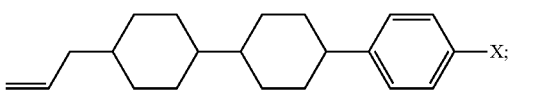

Chemical Formula A-5
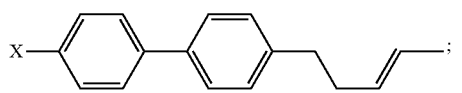

Chemical Formula A-6
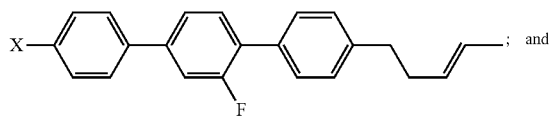

Chemical Formula A-7
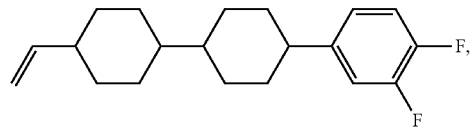

where, in Formulas A-1 to A-7 above, X and Y are each independently a $C_1$-$C_5$ alkyl group.

In still another exemplary embodiment, the liquid crystal composition may further include at least one neutral liquid crystal molecule represented by Chemical Formulas N-1 to N-7 below:

Chemical Formula N-1
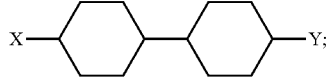

Chemical Formula N-2
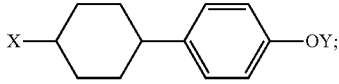

Chemical Formula N-3
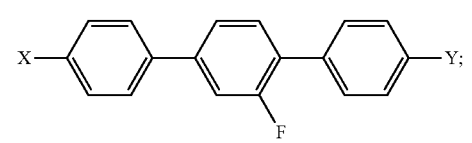

Chemical Formula N-4
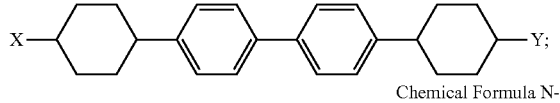

Chemical Formula N-5
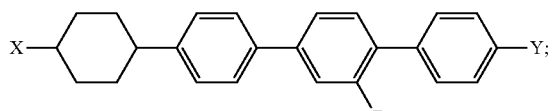

Chemical Formula N-6
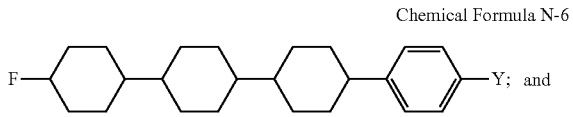

Chemical Formula N-7
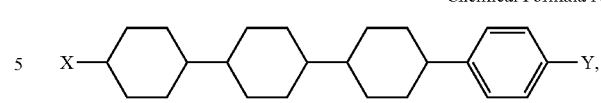

where, in Chemical Formulas N-1 to N-7 above, X and Y are each independently a $C_1$-$C_5$ alkyl group.

In yet another exemplary embodiment, the liquid crystal composition may further include at least one polar liquid crystal molecule represented by Chemical Formulas P-1 to P-12 below:

Chemical Formula P-1
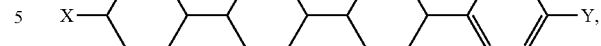

Chemical Formula P-2

Chemical Formula P-3
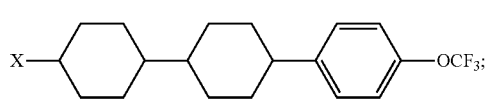

Chemical Formula P-4
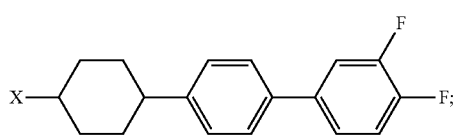

Chemical Formula P-5
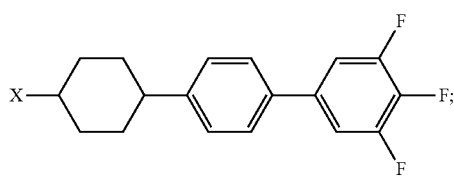

Chemical Formula P-6
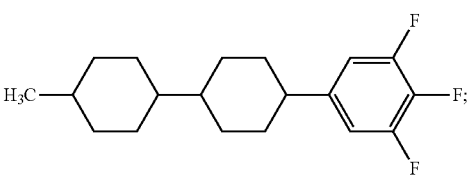

Chemical Formula P-7
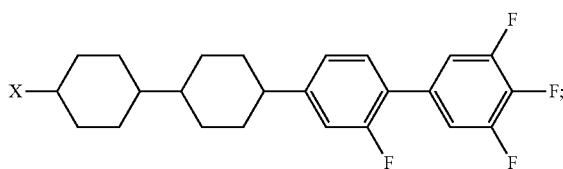

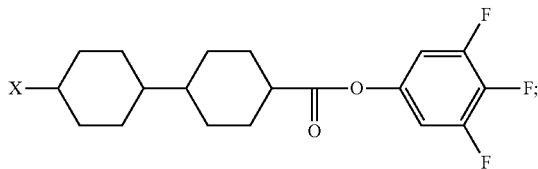

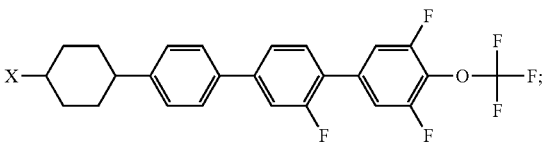

-continued

Chemical Formula P-8
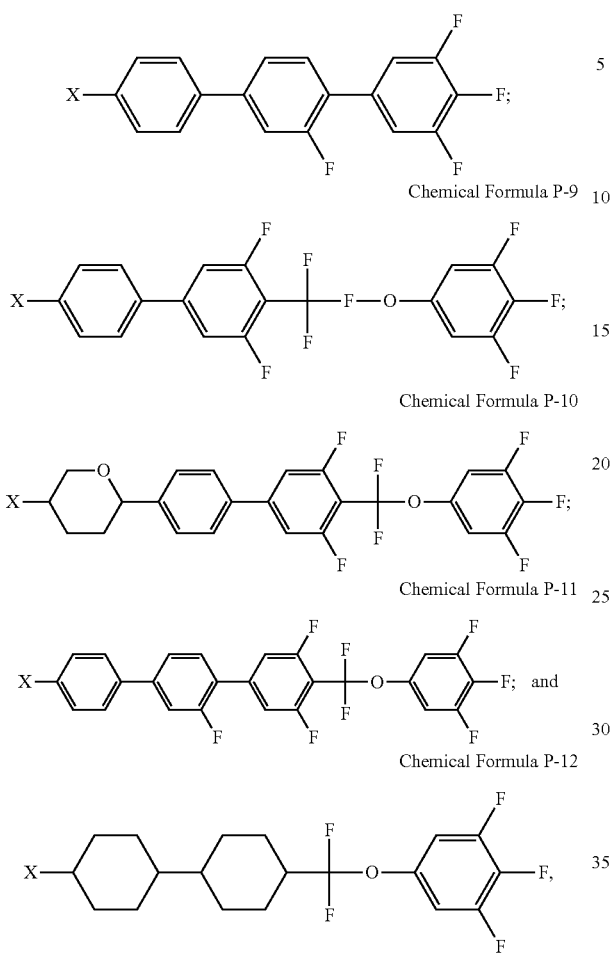
Chemical Formula P-9

Chemical Formula P-10

Chemical Formula P-11

Chemical Formula P-12 where, in Chemical Formulas P-1 to P-12 above, X and Y are each independently a $C_1$-$C_5$ alkyl group.

In another exemplary embodiment, at least one of the liquid crystal molecules represented by Chemical Formulas 1-1 to 1-6, and at least one of the liquid crystal molecules represented by Chemical Formulas 2-1 to 2-6 may be present in the liquid crystal composition in an amount of about 1 weight percent (wt %) to about 20 wt %, based on the total weight of the liquid crystal composition.

In yet another exemplary embodiment, a liquid crystal display includes: a first substrate, a first electrode and a second electrode positioned on the first substrate, with an insulating layer interposed therebetween, a second substrate facing the first substrate; and a liquid crystal layer positioned between the first substrate and the second substrate, where the liquid crystal layer includes at least one liquid crystal molecule represented by Chemical Formulas 1-1 to 1-6 below, and at least one liquid crystal molecules represented by Chemical Formulas 2-1 to 2-6 below:

Chemical Formula 1-1
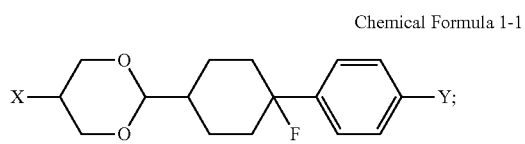

Chemical Formula 1-2
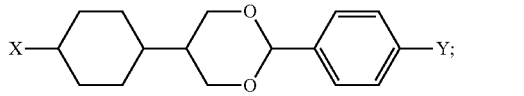

Chemical Formula 1-3
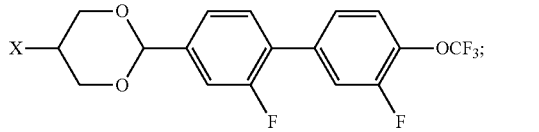

Chemical Formula 1-4
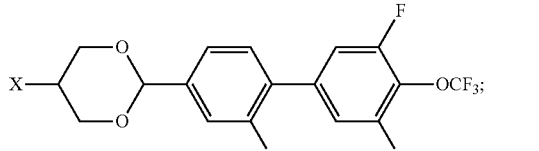

Chemical Formula 1-5
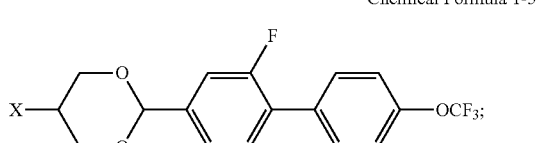

Chemical Formula 1-6
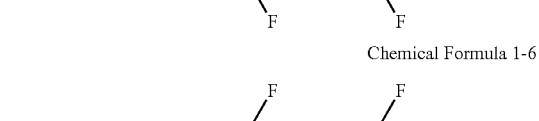

Chemical Formula 2-1
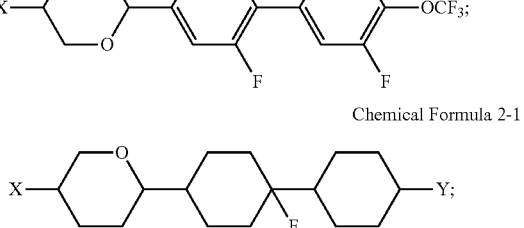

Chemical Formula 2-2
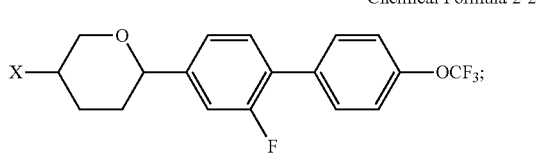

Chemical Formula 2-3
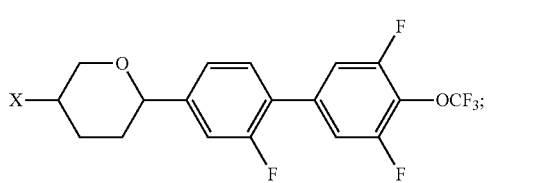

Chemical Formula 2-4
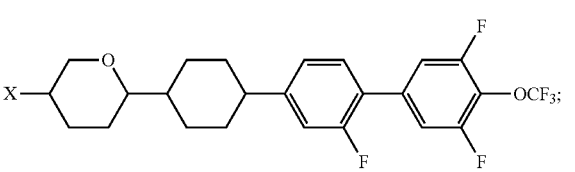

Chemical Formula 2-5

Chemical Formula 2-6 where, in Chemical Formulas 1-1 to 1-6 and Chemical Formulas 2-1 to 2-6 above, X and Y are each independently a $C_1$-$C_5$ alkyl group.

In another exemplary embodiment, the liquid crystal molecules represented by Chemical Formulas 1-1 to 1-6 and the liquid crystal molecules represented by Chemical Formulas 2-1 to 2-6 may include liquid crystal molecules represented by Chemical Formulas 1-11 to 1-16 below and liquid crystal molecules represented by Chemical Formulas 2-11 to 2-16 below, respectively:

Chemical Formula 1-11

Chemical Formula 1-12

Chemical Formula 1-13

Chemical Formula 1-14

Chemical Formula 1-15

Chemical Formula 1-16

Chemical Formula 2-11

Chemical Formula 2-12

Chemical Formula 2-13

Chemical Formula 2-14

Chemical Formula 2-15

Chemical Formula 2-16

In still another exemplary embodiment, the liquid crystal layer may further include at least one alkenyl-based liquid crystal molecule represented by Chemical Formulas A-1 to A-7 below:

Chemical Formula A-1

Chemical Formula A-2

Chemical Formula A-3
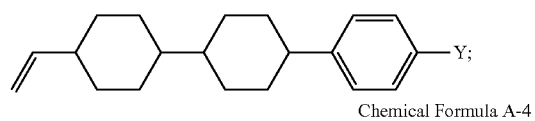

Chemical Formula A-4
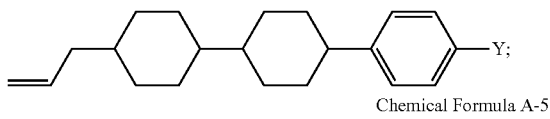

Chemical Formula A-5
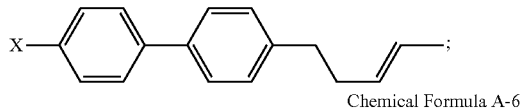

Chemical Formula A-6
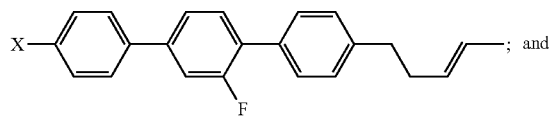

Chemical Formula A-7
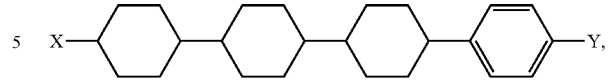; and

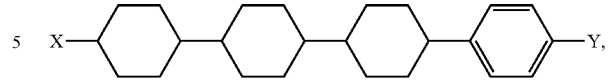

where, in Chemical Formulas A-1 to A-7 above, X and Y are each independently a $C_1$-$C_5$ alkyl group.

In still yet another exemplary embodiment, the liquid crystal layer may further include at least one neutral liquid crystal molecule represented by Chemical Formulas N-1 to N-7 below:

Chemical Formula N-1
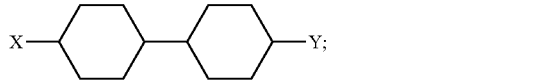

Chemical Formula N-2
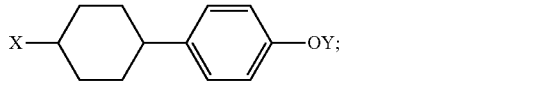

Chemical Formula N-3
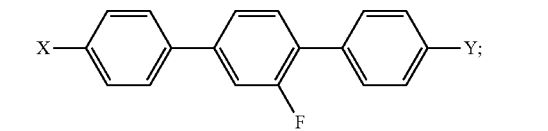

Chemical Formula N-4
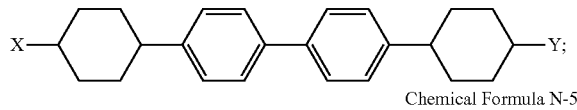

Chemical Formula N-5
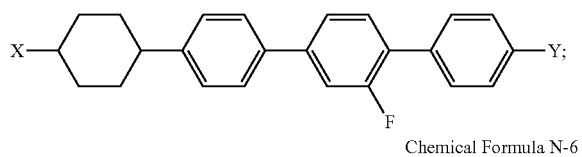

Chemical Formula N-6
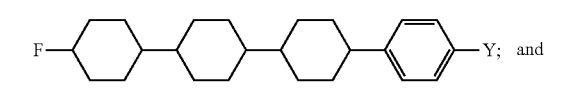; and

Chemical Formula N-7
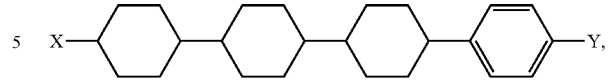

where, in Chemical Formulas N-1 to N-7 above, X and Y are each independently a of $C_1$-$C_5$ alkyl group.

In another exemplary embodiment, the liquid crystal layer may further include at least one polar liquid crystal molecule represented by Chemical Formulas P-1 to P-12 below:

Chemical Formula P-1

Chemical Formula P-2
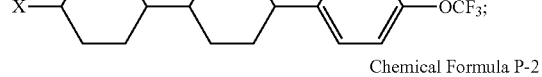

Chemical Formula P-3
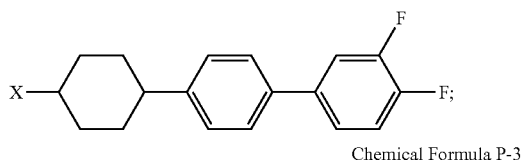

Chemical Formula P-4
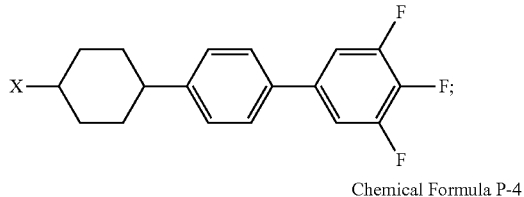

Chemical Formula P-5
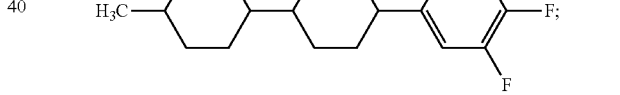

Chemical Formula P-6
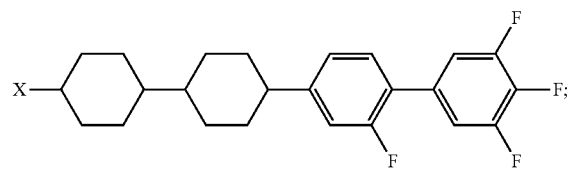

Chemical Formula P-7
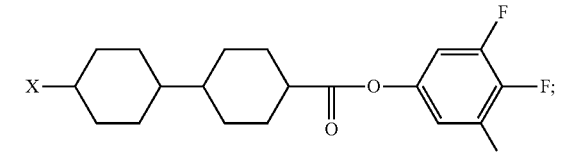

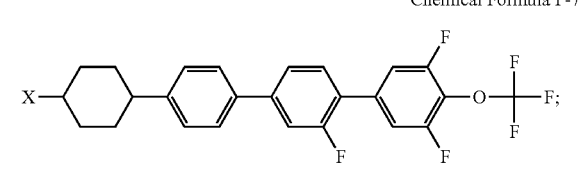

-continued

Chemical Formula P-8

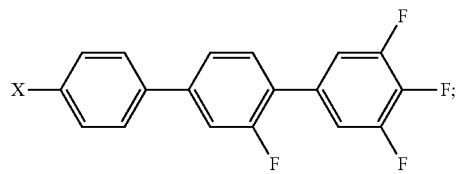

Chemical Formula P-9

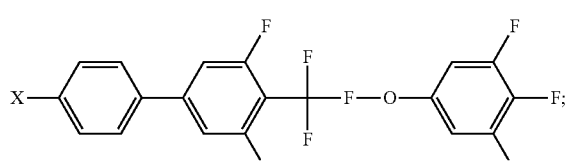

Chemical Formula P-10

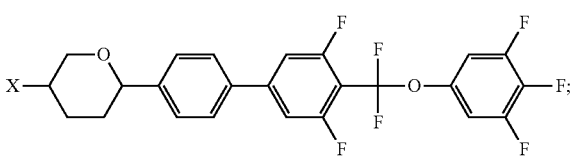

Chemical Formula P-11

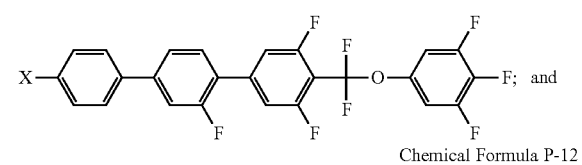

Chemical Formula P-12

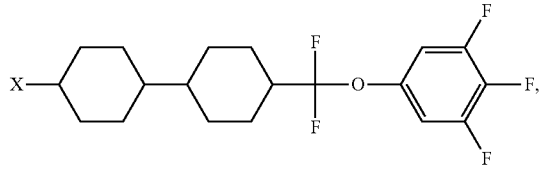

where, in Chemical Formulas P-1 to P-12 above, X and Y are each independently a $C_1$-$C_5$ alkyl group.

In an exemplary embodiment, at least one of the liquid crystal molecules represented by Chemical Formulas 1-1 to 1-6, and at least one of the liquid crystal molecules represented by Chemical Formulas 2-1 to 2-6 may be present in the liquid crystal composition in an amount of about 1 wt % to about 20 wt %, based on the total weight of the liquid crystal composition.

In an exemplary embodiment, the insulating layer may be positioned on the first electrode, and the second electrode may be positioned on the insulating layer, and the first electrode may have an integrated plate shape, and the second electrode may include a plurality of branch electrodes.

In an aspect of the exemplary embodiment, the plurality of branch electrodes may be overlapped with the first electrode in an integrated plate shape.

In another aspect of the exemplary embodiment, the second electrode may be connected to a thin film transistor by a contact hole penetrating the insulating layer.

In still another aspect of the exemplary embodiment, the liquid crystal molecules included in the liquid crystal layer may be tilted in a direction parallel to the branch electrodes when an electric field is not applied to the liquid crystal layer.

In still yet another aspect of the exemplary embodiment, the liquid crystal display may further include: alignment layers positioned on the second electrode and rubbed in a direction parallel to the branch electrodes.

In another aspect of the exemplary embodiment, the liquid crystal molecules may be tilted in a direction horizontal to an electric field when the electric field is applied to the liquid crystal layer.

In still another aspect of the exemplary embodiment, the first electrode may have an integrated plate shape in a portion corresponding to unit pixels.

In an exemplary embodiment, the liquid crystal display, employing the liquid crystal composition having a positive dielectric anisotropy, is capable of increasing a glass transition temperature and maintaining low rotation viscosity, thereby improving response speed.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
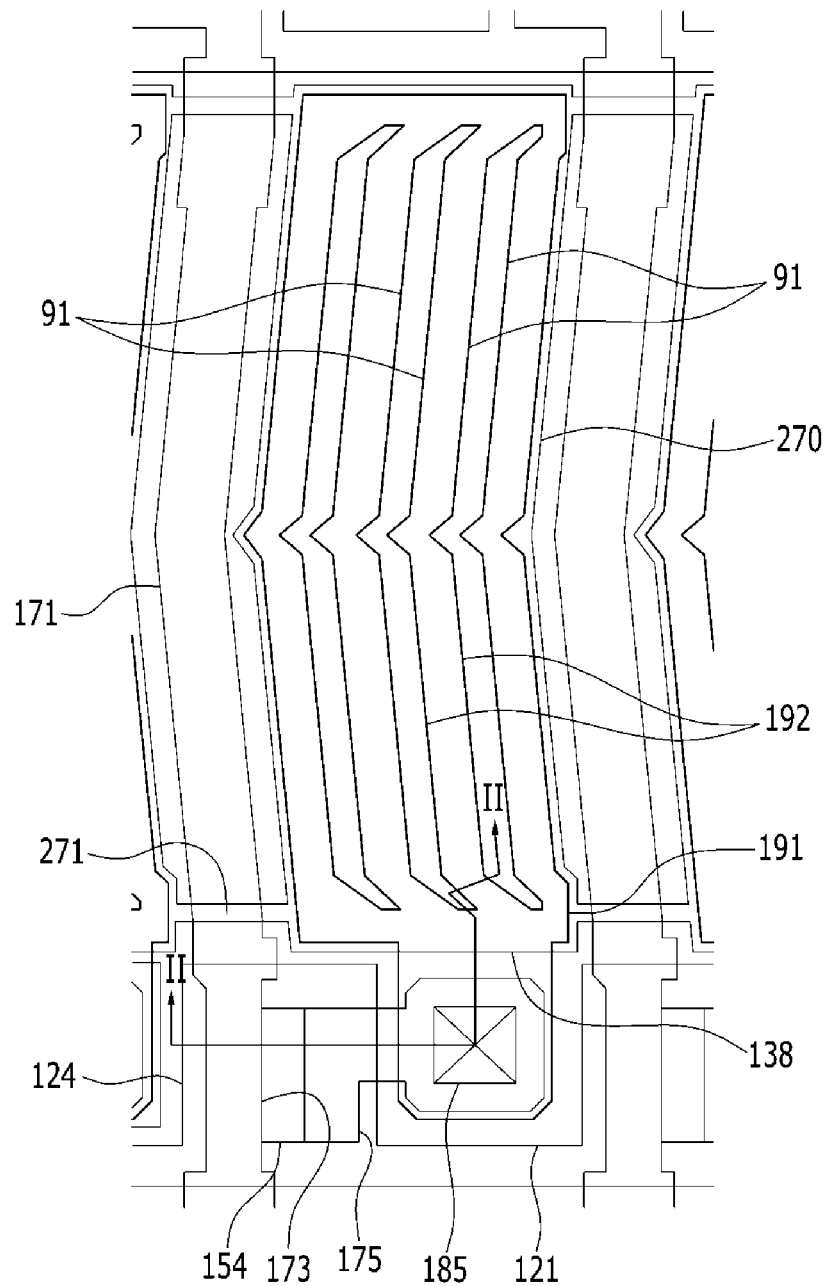
FIG. 1 is a top plan view of an exemplary embodiment of a liquid crystal display.

Hereinafter, exemplary embodiments of the present invention will be described in detail with reference to the accompanying drawings. However, the present invention is not limited to the exemplary embodiments which are described herein, and may be modified in various different ways. Rather, the exemplary embodiments of the present invention to be described below are provided so that the idea of the present invention can be sufficiently transferred to those skilled in the art to which the present invention pertains. Like reference numerals refer to like elements throughout.

In the drawings, thicknesses of layers and regions are exaggerated for clarity. In addition, in the case in which it is stated that a layer is present "on" another layer or a substrate, the layer may be directly formed on another layer or the substrate or have the other layer interposed therebetween. Portions denoted by like reference numerals mean like elements throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. In order to provide a liquid crystal display having a high speed response, high transmittance, and the like, technical research into improving physical properties such as the rotation viscosity, refractive index, and the like, of the liquid crystal composition has been conducted.

In an exemplary embodiment, a liquid crystal composition includes at least one liquid crystal molecules represented by Chemical Formulas 1-1 to 1-6 below, and at least one liquid crystal molecules represented by Chemical Formulas 2-1 to 2-6 below:

Chemical Formula 1-1

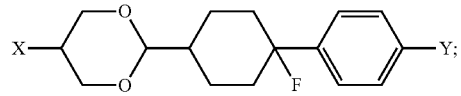

Chemical Formula 1-2

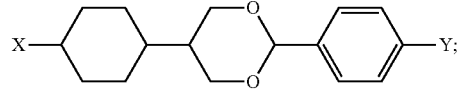

Chemical Formula 1-3

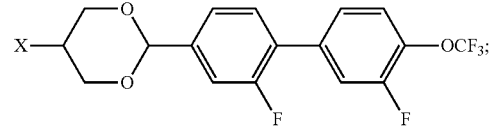

Chemical Formula 1-4

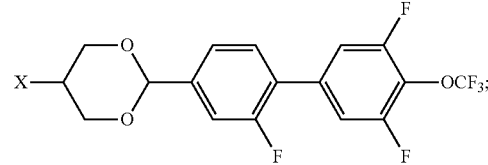

Chemical Formula 1-5

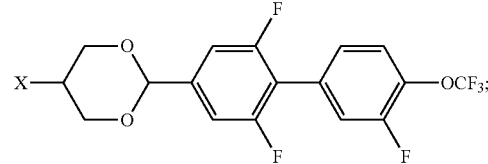

Chemical Formula 1-6

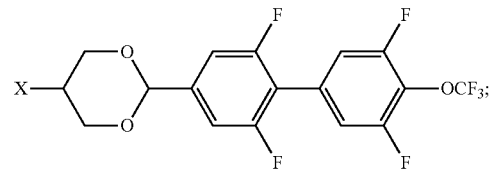

Chemical Formula 2-1

Chemical Formula 2-2

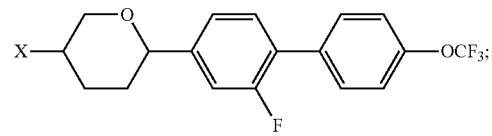

Chemical Formula 2-3

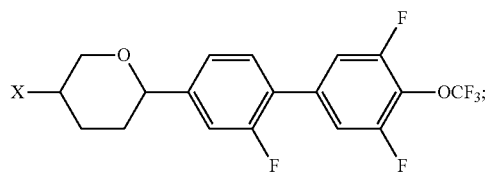

Chemical Formula 2-4

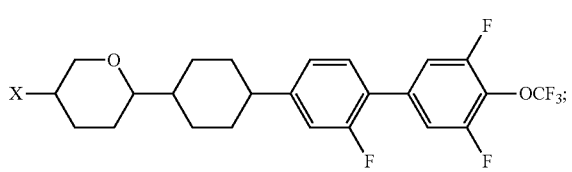

Chemical Formula 2-5

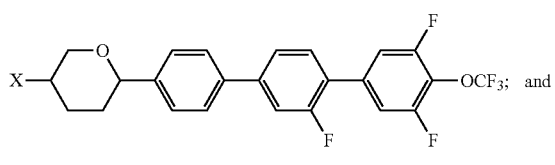

Chemical Formula 2-6

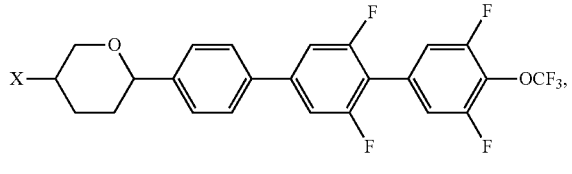

where, in Chemical Formulas 1-1 to 1-6 and Chemical Formulas 2-1 to 2-6 above, X and Y are each independently a $C_1$-$C_5$ alkyl group.

Chemical Formulas 1-1 to 1-6 above refer to 1,3-dioxane having a particular chemical structure, and Chemical Formulas 2-1 to 2-6 refer to tetrahydropyran having a particular chemical structure.

In an exemplary embodiment, at least one of the liquid crystal molecules represented by Chemical Formulas 1-1 to 1-6 above, and at least one of the liquid crystal molecules represented by Chemical Formulas 2-1 to 2-6 above may be present in the liquid crystal composition in an amount of about 1 weight percent (wt %) to about 20 wt %, based on the total weight of the liquid crystal composition.

In another exemplary embodiment, the liquid crystal molecules represented by Chemical Formulas 1-1 to 1-6 and the liquid crystal molecules represented by Chemical Formulas 2-1 to 2-6 may include liquid crystal molecules represented by Chemical Formulas 1-11 to 1-16 below and liquid crystal molecules represented by Chemical Formulas 2-11 to 2-16 below, respectively. Specifically, the liquid crystal molecule represented by Chemical Formula 1-1 includes the liquid crystal molecule represented by Chemical Formula 1-11, the liquid crystal molecule represented by Chemical Formula 1-2 includes the liquid crystal molecule represented by Chemical Formula 1-12, and the liquid crystal molecule represented by Chemical Formula 2-6 includes the liquid crystal molecule represented by Chemical Formula 2-16. Other remaining Chemical Formulas have the same corresponding relationships. Chemical Formulas 1-11 to 1-16 and 2-11 to 2-16 are provided below:

Chemical Formula 1-11

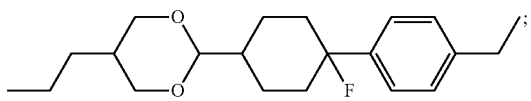

Chemical Formula 1-12

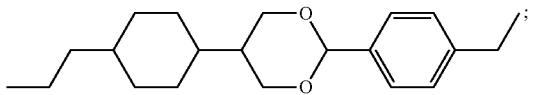

Chemical Formula 1-13

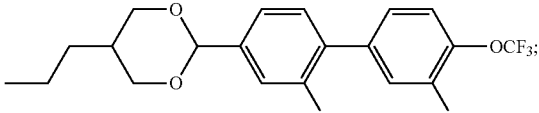

Chemical Formula 1-14

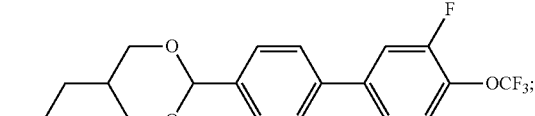

Chemical Formula 1-15

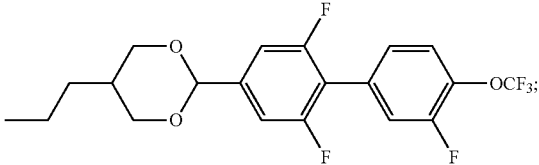

Chemical Formula 1-16

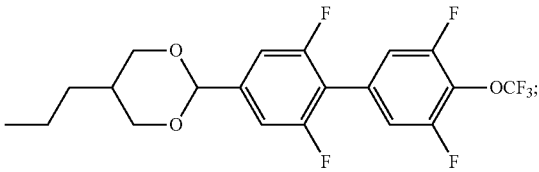

Chemical Formula 2-11

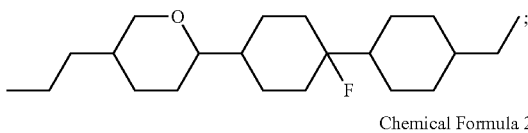

Chemical Formula 2-12

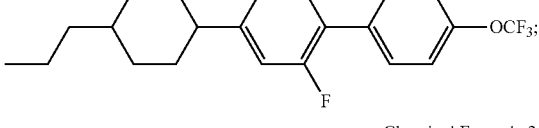

Chemical Formula 2-13

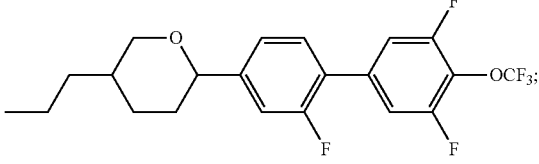

-continued

Chemical Formula 2-14

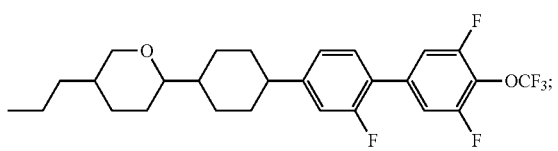

Chemical Formula 2-15

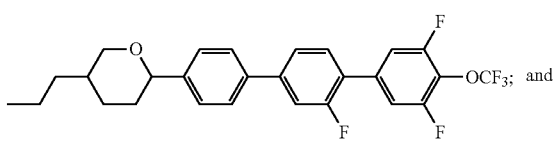

Chemical Formula 2-16

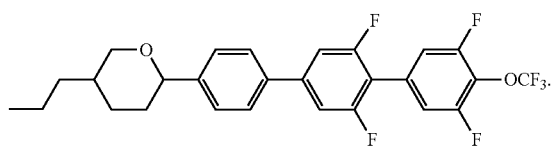

Table 1 below shows the physical properties of the liquid crystal molecules represented by Chemical Formulas 1-11 to 1-16 and Chemical Formulas 2-11 to 2-16.

TABLE 1

| Chemical Formula Number | Dipole | Refractive Anisotropy ($\Delta n$) | Dielectric Anisotropy ($\Delta \epsilon$) |
|---|---|---|---|
| Chemical Formula 1-11 | 1.2326 | 0.1087 | 1.1269 |
| Chemical Formula 1-12 | 2.0479 | 0.1134 | 1.1728 |
| Chemical Formula 1-13 | 6.8204 | 0.162 | 25.465 |
| Chemical Formula 1-14 | 7.5557 | 0.1555 | 31.551 |
| Chemical Formula 1-15 | 7.2178 | 0.1528 | 32.302 |
| Chemical Formula 1-16 | 8.1268 | 0.1466 | 38.058 |
| Chemical Formula 2-11 | 1.5319 | 0.0545 | 0.2152 |
| Chemical Formula 2-12 | 4.8621 | 0.1676 | 17.305 |
| Chemical Formula 2-13 | 6.6426 | 0.1544 | 29.51 |
| Chemical Formula 2-14 | 6.8749 | 0.1421 | 24.713 |
| Chemical Formula 2-15 | 7.1332 | 0.205 | 29.086 |
| Chemical Formula 2-16 | 7.8316 | 0.196 | 34.238 |

In an exemplary embodiment, the liquid crystal composition may further include at least one alkenyl-based liquid crystal molecule represented by Chemical Formulas A-1 to A-7 below:

Chemical Formula A-1

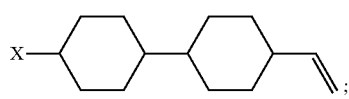

Chemical Formula A-2

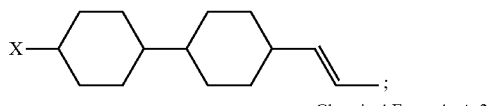

Chemical Formula A-3

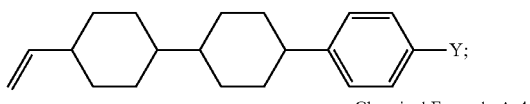

Chemical Formula A-4

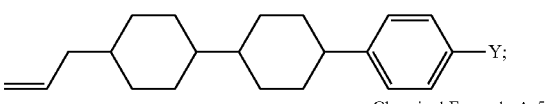

Chemical Formula A-5

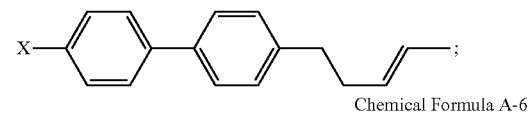

Chemical Formula A-6

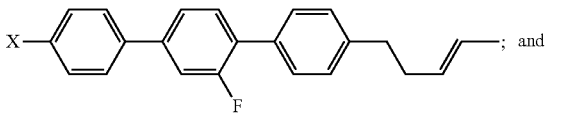

Chemical Formula A-7

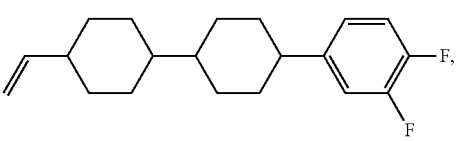

where, in Chemical Formulas A-1 to A-7 above, X and Y are each independently a $C_1$-$C_5$ alkyl group.

In an exemplary embodiment, the alkenyl-based liquid crystal molecules represented by Chemical Formulas A-1 to A-7 above may be low viscosity neutral liquid crystal molecules in the liquid crystal composition, and may exhibit a high speed response property due to their low viscosity as compared to other liquid crystal molecules.

In an exemplary embodiment, the liquid crystal composition may further include at least one neutral liquid crystal molecule represented by Chemical Formulas N-1 to N-7 below:

Chemical Formula N-1

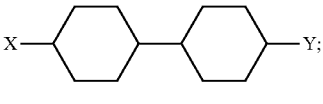

Chemical Formula N-2

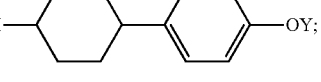

Chemical Formula N-3

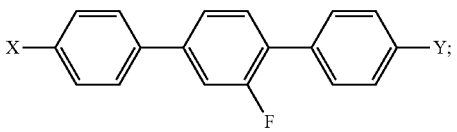

Chemical Formula N-4

Chemical Formula N-5

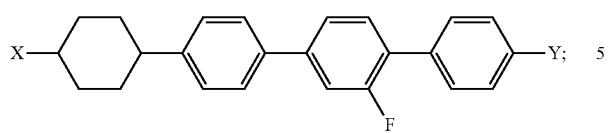

Chemical Formula N-6

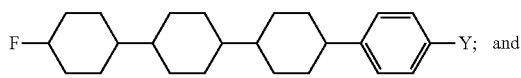

Chemical Formula N-7

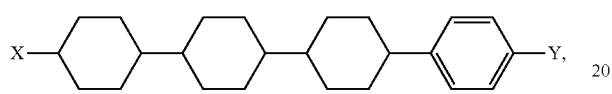

where, in Chemical Formulas N-1 to N-7 above, X and Y are each independently a $C_1$-$C_5$ alkyl group.

In an exemplary embodiment, the liquid crystal composition may further include at least one polar liquid crystal molecule represented by Chemical Formulas P-1 to P-12 below:

Chemical Formula P-1

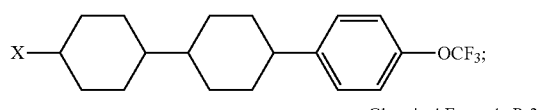

Chemical Formula P-2

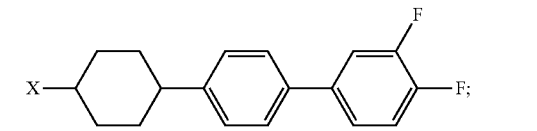

Chemical Formula P-3

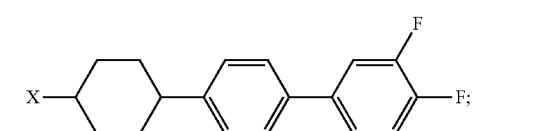

Chemical Formula P-4

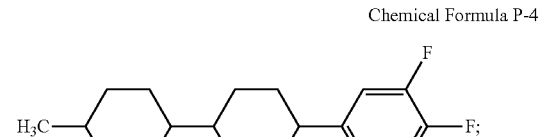

Chemical Formula P-5

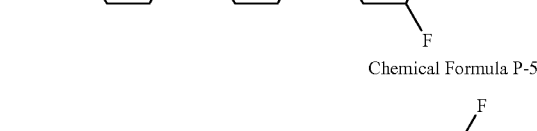

Chemical Formula P-6

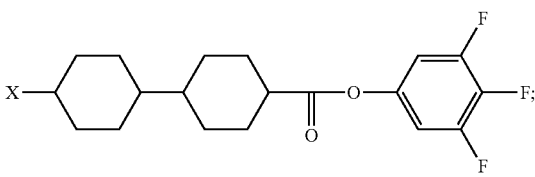

Chemical Formula P-7

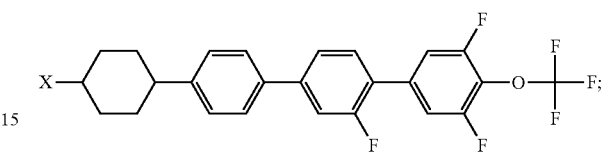

Chemical Formula P-8

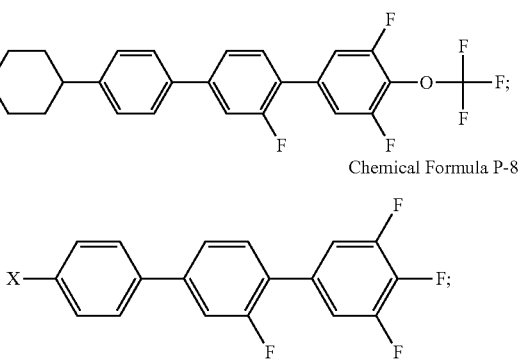

Chemical Formula P-9

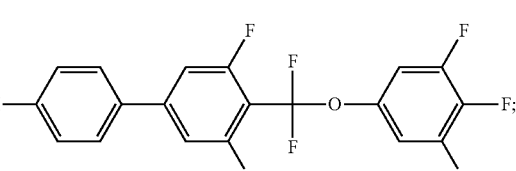

Chemical Formula P-10

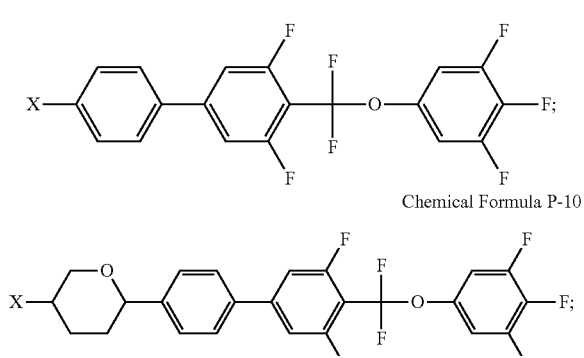

Chemical Formula P-11

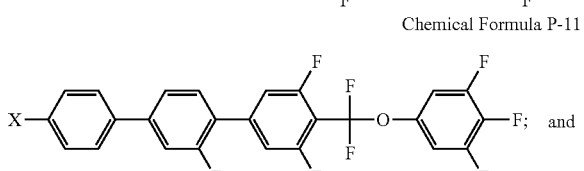

Chemical Formula P-12

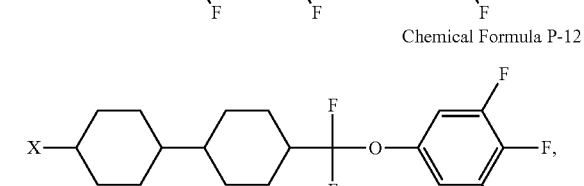

where, in Chemical Formulas P-1 to P-12 above, X and Y are each independently a $C_1$-$C_5$ alkyl group.

Hereinafter, a liquid crystal display manufactured by using the liquid crystal composition described above is described.

Figure 2:
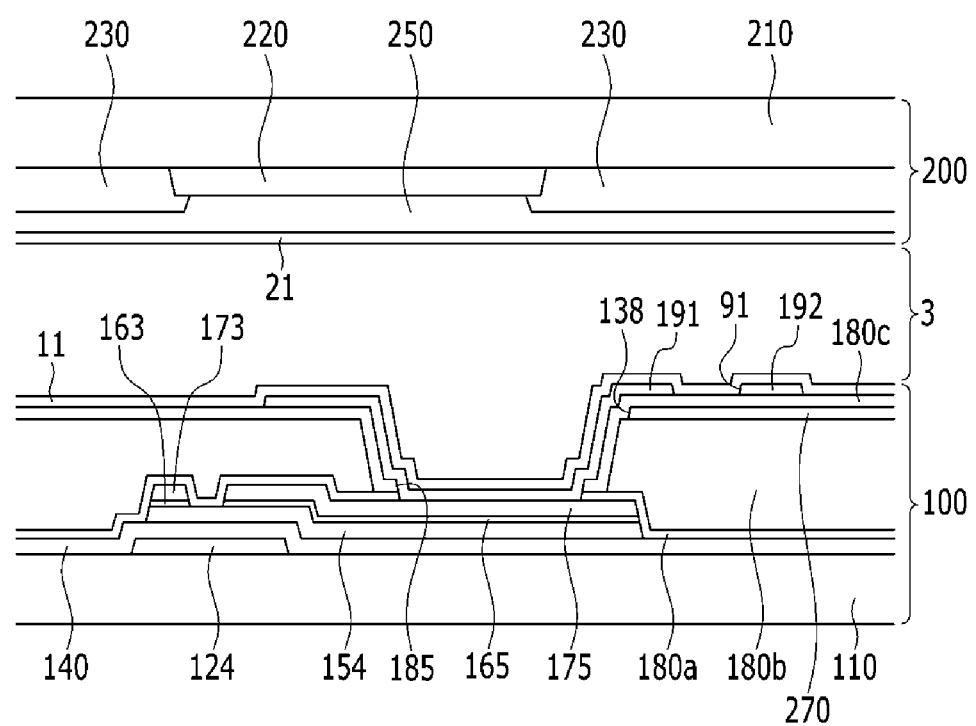
FIG. 2 is a cross-sectional view taken along line II-II of FIG. 1.

FIG. 1 is a top plan view of an exemplary embodiment of the liquid crystal display. FIG. 2 is a cross-sectional view taken along line II-II of FIG. 1.

Referring to FIGS. 1 and 2, an exemplary embodiment of the liquid crystal display includes a lower display panel 100, an upper display panel 200 and a liquid crystal layer 3 interposed therebetween, wherein the lower display panel and the upper display panel face each other.

First, the lower display panel 100 is described.

A gate conductor including a gate line 121 is formed on a first substrate 110 formed of transparent glass, plastic, or the like.

The gate line 121 may include a wide end portion (not shown) for allowing a connection with a gate electrode 124 and other layers or external driving circuits. The gate line 121 may be formed of aluminum-based metals such as aluminum (Al), aluminum alloy, and the like, silver-based metals such as silver (Ag), silver alloy, and the like, copper-based metals such as copper (Cu), copper alloy, and the like, molybdenum-based metals such as molybdenum (Mo), molybdenum alloy, and the like, chromium (Cr), tantalum (Ta), titanium (Ti), an alloy thereof, and the like. However, the gate line 121 may have a multilayer structure including at least two conductive layers having different physical properties.

A gate insulating layer 140 formed of silicon nitride (SiNx), silicon oxide (SiOx), or the like, is formed on the gate line 121. The gate insulating layer 140 may have a multilayer structure including at least two insulating layers having different physical properties.

A semiconductor layer 154 is formed from amorphous silicon or polysilicon material, or the like, and is formed on the gate insulating layer 140. The semiconductor layer 154 may be formed from an oxide semiconductor material.

Ohmic contacts 163 and 165 are formed on the semiconductor layer 154. The ohmic contacts 163 and 165 may be formed from a n+ hydrogenated amorphous silicon material in which n-type impurities such as phosphorus are doped or may be formed of silicide. The ohmic contacts 163 and 165 may be disposed in pairs on the semiconductor layer 154. When the semiconductor layer 154 is an oxide semiconductor, the ohmic contacts 163 and 165 may be omitted.

A data line 171 including the source electrode 173 and a data conductor including a drain electrode 175 are formed on the ohmic contacts 163 and 165 and the gate insulating layer 140.

The data line 171 includes a wide end portion (not shown) for allowing a connection with other layers or external driving circuits. The data line 171 transmits a data signal, is mainly extended in a vertical direction, and is intersected with the gate line 121.

Here, the data line 171 may have a curved portion having a bent shape in order to obtain maximum transmittance of the liquid crystal display, and the curved portion may be bent at a middle region of the pixel area to form a "V" shape.

The source electrode 173 is a portion of the data line 171, and is disposed on the same line as the data line 171. The drain electrode 175 is extended such that it is parallel to the source electrode 173. Therefore, the drain electrode 175 is parallel to a portion of the data line 171.

The gate electrode 124, the source electrode 173, and the drain electrode 175 together with the semiconductor layer 154 form one thin film transistor ("TFT"), and a channel of the thin film transistor is formed on the semiconductor layer 154 between the source electrode 173 and the drain electrode 175.

In an exemplary embodiment, the liquid crystal display may include the source electrode 173 positioned on the same line as the data line 171 and the drain electrode 175 extending in parallel to the data line 171, to widen a width of the thin film transistor without widening an area occupied by the data conductor. Thereby, an aperture ratio of the liquid crystal display may be increased.

The data line 171 and the drain electrode 175 are formed of refractory metals such as molybdenum, chromium, tantalum, titanium, and the like, or alloys thereof, and may have a multilayer structure including a refractory metal layer (not shown) and a low-resistance conductive layer (not shown). Examples of the multilayer structure may include a bi-layer having a lower layer formed using chromium or molybdenum or an alloy thereof and an upper layer formed using aluminum or an alloy thereof, and a triple-layer having a lower layer formed using molybdenum or an alloy thereof, an aluminum or an aluminum alloy intermediate layer and a molybdenum or molybdenum or molybdenum alloy upper layer.

A first passivation layer 180*a* is disposed on portions of which the data conductors 171, 173 and 175, the gate insulating layer 140, and the semiconductor layer 154 are exposed. The first passivation layer 180*a* may be formed from organic insulating materials, inorganic insulating materials, or the like.

A second passivation layer 180*b* is formed on the first passivation layer 180*a*. The second passivation layer 180*b* may be formed from organic insulators.

The second passivation layer 180*b* may be a color filter. When the second passivation layer 180*b* is the color filter, the second passivation layer 180*b* may selectively show one of the primary colors, and examples of the primary colors may include three primary colors such as red, green, blue, and the like, or yellow, cyan, magenta, and the like. Although not shown, the color filter may further include a color filter expressing a mixed color of the primary colors or white, in addition to the primary color. In the case in which the second passivation layer 180*b* is the color filter, the upper display panel 200 described below may omit the color filter 230. Unlike the present exemplary embodiment, the second passivation layer 180*b* may be formed from organic insulating materials, and may include the color filter (not shown) between the first passivation layer 180*a* and the second passivation layer 180*b*.

A common electrode 270 is positioned on the second passivation layer 180*b*. The common electrode 270 has a planar shape, may be formed in an integrated plate shape on a front surface of the substrate 110, and has an opening 138 disposed in a region corresponding to the periphery of the drain electrode 175. The opening 138 may extend in a direction parallel to the gate line 121, and may be formed in an isolated form even in a portion overlapping the data line 171. That is, in the present exemplary embodiment, the common electrode 270 may have an integrated plate shape which is connected without being split in portions corresponding to unit pixels. Here, the common electrode portions 270 of respective neighboring pixels in a direction of the gate line 121 may be connected through a connection part 271.

The common electrodes 270 positioned on the adjacent pixels may be connected to each other to receive a common voltage having a predetermined size supplied from the outside of the display area.

An insulating layer 180*c* is positioned on the common electrode 270. The insulating layer 180*c* may be formed of organic insulating materials, inorganic insulating materials, or the like.

A pixel electrode 191 is positioned on the insulating layer 180*c*. The pixel electrode 191 includes curved edges nearly parallel to the curved portion of the data line 171. The pixel electrode 191 has a plurality of cutouts 91, and includes a plurality of branch electrodes 192 positioned between neighboring cutouts 91. In a plan view, the plurality of branch electrodes 192 overlap the common electrode 270.

The pixel electrode 191 is a first field generating electrode or a first electrode, and the common electrode 270 is a second field generating electrode or a second electrode. The pixel electrode 191 and the common electrode 270 may form a fringe field, and the like.

A contact hole 185 exposing the drain electrode 175 is formed in the first passivation layer 180a, the second passivation layer 180b and the insulating layer 180c. The pixel electrode 191 is physically electrically connected to the drain electrode 175 through the contact hole 185 to thereby receive a voltage applied from the drain electrode 175.

A first alignment layer 11 is formed on the pixel electrode 191 and the insulating layer 180c. The first alignment layer 11 may be a horizontal alignment layer, and may be rubbed in a predetermined direction. However, the first alignment layer 11 is not limited to the rubbing alignment layer, but may be a photo-alignment layer.

The upper display panel 200 is described.

A light blocking member 220, a plurality of color filters 230, an overcoat 250, and a second alignment layer 21 are disposed between a second substrate 210 and the liquid crystal layer 3. The second substrate 210 is formed of transparent glass, plastic, or the like. The light blocking member 220 is also referred to as a black matrix, and prevents light leakage.

The light blocking member 220 is disposed between color filter 230 adjacent to each other of the plurality of color filters 230. When the second passivation layer 180b of the lower display panel 100 is a color filter, or when the color filter is formed on the lower display panel 100, the color filter 230 of the upper display panel 200 may be omitted. In addition, the light blocking member 220 of the upper display panel 200 may also be formed on the lower display panel 100.

The overcoat 250 is disposed between the second alignment layer 21 and the color filter 230, and between the second alignment layer 21 and the light blocking member 220. The overcoat 250 may be formed from insulators, such as organic insulators, and prevents the color filter 230 from being exposed, and provides a flat surface. The overcoat 250 may be omitted.

The second alignment layer 21 is disposed between the liquid crystal layer 3 and the overcoat 250. The second alignment layer 21 may be formed from the same materials as the first alignment layer 11 described above.

The liquid crystal layer 3 is interposed between the lower display panel 100 and the upper display panel 200. In the present exemplary embodiment, the liquid crystal layer 3 includes liquid crystal molecules of 1,3-dioxane having a particular chemical structure such as those represented in Chemical Formulas 1-1 to 1-6 and liquid crystal molecules of tetrahydropyran having a particular chemical structure such as those represented in Chemical Formulas 2-1 to 2-6, and the above specific description regarding the liquid crystal composition may be applied thereto.

Figure 3:
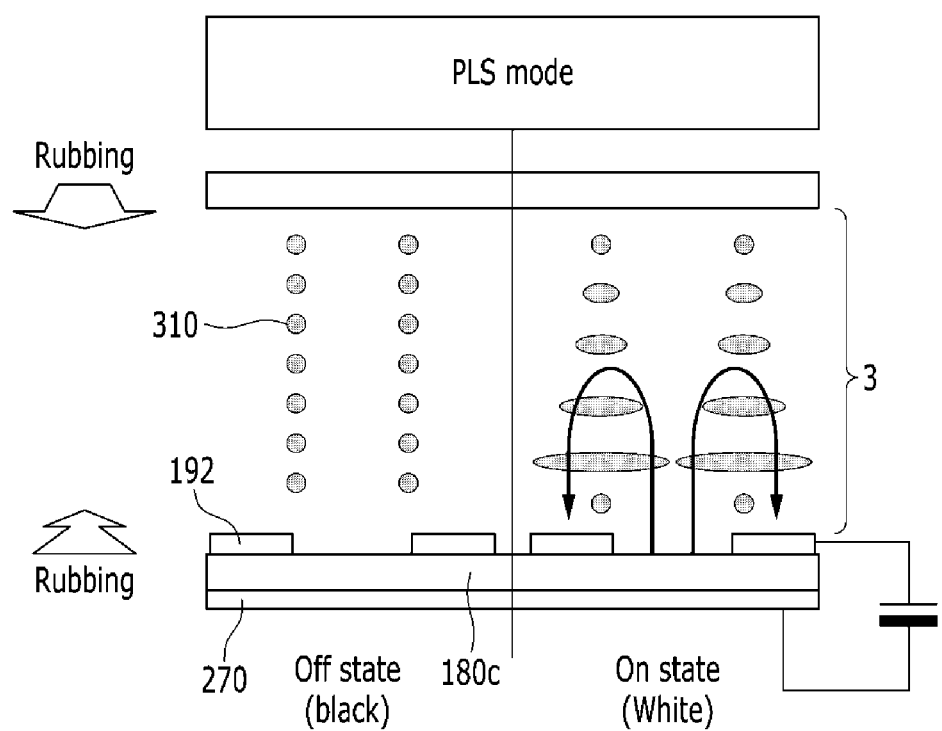
FIG. 3 is a cross-sectional view schematically showing an exemplary embodiment of an alignment of liquid crystal molecules according to whether or not an electric field is applied in the liquid crystal display.

FIG. 3 is a cross-sectional view schematically showing an exemplary embodiment of the alignment of liquid crystal molecules according to whether or not an electric field is applied in the liquid crystal display.

Referring to FIG. 3, in an exemplary embodiment, a first alignment layer 11 and a second alignment layer 21 may be rubbed in a direction parallel to the plurality of branch electrodes 192. However, when the first alignment layer 11 and the second alignment layer 21 are formed from photo-alignment materials, surfaces of the first alignment layer 11 and the second alignment layer 21 may be photo-aligned in a direction parallel to the plurality of branch electrodes 192.

The liquid crystal molecules 310 of the liquid crystal layer 3 may be aligned so that a direction of a major axis thereof is parallel to the display panels 100 and 200. In particular, in exemplary embodiment, the major axis of the liquid crystal molecules 310 may extend in a direction parallel to the plurality of branch electrodes 192 in an off state in which an electric field is not applied. In other words, the liquid crystal molecules 310 are tilted in a direction in which the branch electrodes 192 extend.

In an exemplary embodiment, the major axis of the liquid crystal molecules 310 may be aligned so as to be horizontal to an electric field direction in an on state in which an electric field is applied. In an aspect of the exemplary embodiment, the liquid crystal display is a positive type in-plane switching mode liquid crystal display, and accordingly, the liquid crystal layer 3 may be formed of the liquid crystal materials in which the entire liquid crystal composition has a positive polarity. The liquid crystal display shown in FIG. 3 is a plane to line switching mode liquid crystal display in which an electric field of the liquid crystal layer 3 is formed by a planar field generating electrode and a linear field generating electrode, particularly, with the insulating layer interposed therebetween.

Referring back to FIGS. 1 and 2, the pixel electrode 191 receives a data voltage from the drain electrode 175, and the common electrode 270 receives a predetermined size of common voltage from a common voltage applying part disposed outside of the display area.

The pixel electrode 191 and the common electrode 270, which are field generating electrodes, may generate an electric field, such that the liquid crystal molecules of the liquid crystal layer 3 positioned on the two field generating electrodes 191 and 270 may be vertical to a direction of the electric field or may rotate in a direction parallel to the direction of an electric field. Polarized light passing through the liquid crystal layer is changed depending on the rotation direction, determined as described above, of the liquid crystal molecules.

As described above, two field generating electrodes 191 and 270 may be formed on one display panel 100 to increase the transmittance of the liquid crystal display, and to implement a wide-viewing angle.

In an exemplary embodiment of the liquid crystal display, the common electrode 270 has a planar flat shape, and the pixel electrode 191 has the plurality of branch electrodes. However, in another exemplary embodiment of the liquid crystal display, the pixel electrode 191 may have the planar flat shape, and the common electrode 270 may have the plurality of branch electrodes.

The present invention is applicable to all other cases in which two field generating electrodes overlap on the first substrate 110 with the insulating layer interposed therebetween, and the first field generating electrode formed below the insulating layer has the planar flat shape, and the second field generating electrode formed on the insulating layer has the plurality of branch electrodes.

The display panels 100 and 200 may have polarizers (not shown) provided on the outer surfaces thereof, wherein transmission axes of the polarizers are orthogonal to each other, and one transmission axis of them is preferably parallel to the gate line 121. One of two polarizers may be omitted in a reflective liquid crystal display.

Figure 4:
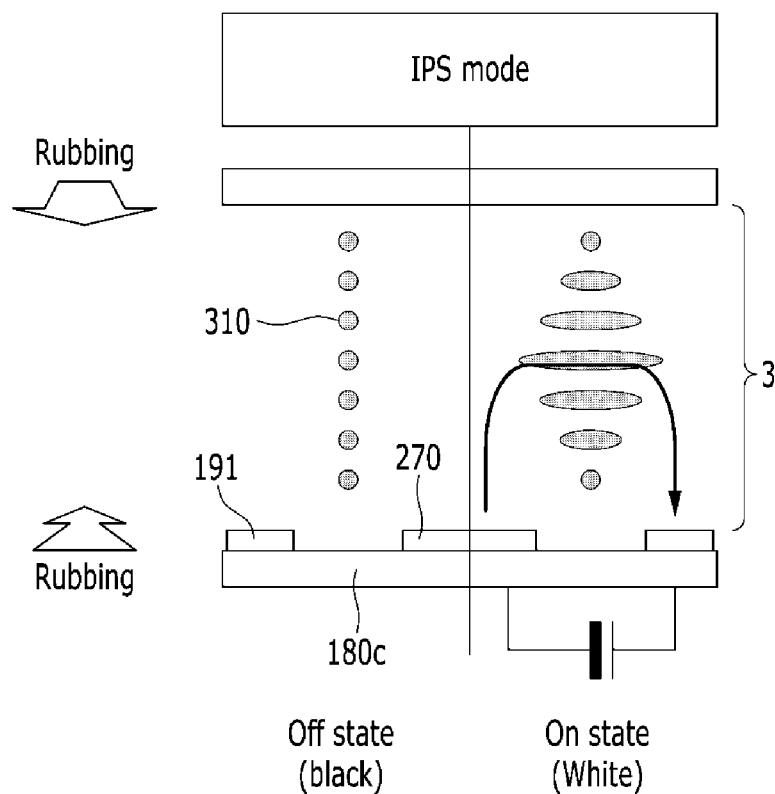
FIG. 4 is a cross-sectional view schematically showing an exemplary embodiment of an in-plane switching mode liquid crystal display obtained by modifying the liquid crystal display of FIG. 3.

FIG. 4 is a cross-sectional view schematically showing an exemplary embodiment of an in-plane switching mode liquid crystal display obtained by modifying the liquid crystal display of FIG. 3.

Referring to FIG. 4, the liquid crystal display is a positive type in-plane switching mode liquid crystal display in which all of the pixel electrode 191 and the common electrode 270 are linear field generating electrodes, unlike the plane to line switching mode liquid crystal display shown in FIG. 3. In the present exemplary embodiment, similar to the exemplary embodiment of FIG. 3, a horizontal electric field is formed and an alignment direction of the alignment layer is parallel to the linear electrode, such that the liquid crystal display may be formed by using the above-described liquid crystal composition.

In another exemplary embodiment, a method of manufacturing a liquid display includes disposing a first electrode and a second electrode on a first substrate, with an insulating layer interposed therebetween; disposing a second substrate which faces the first substrate; and disposing a liquid crystal layer between the first substrate and the second substrate, wherein the liquid crystal layer comprises at least one liquid crystal molecule represented by Chemical Formulas 1-1 to 1-6 below, and at least one liquid crystal molecule represented by Chemical Formulas 2-1 to 2-6 below:

Chemical Formula 1-1
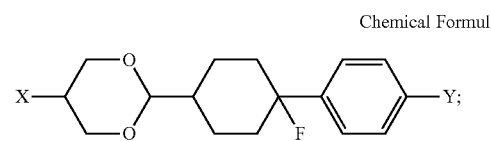

Chemical Formula 1-2
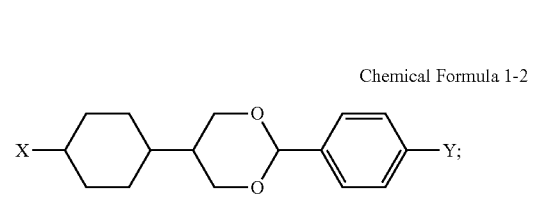

Chemical Formula 1-3
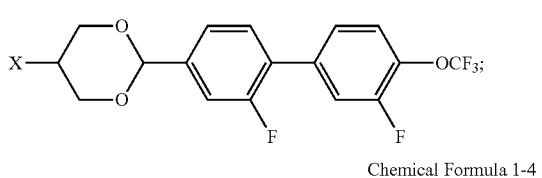

Chemical Formula 1-4
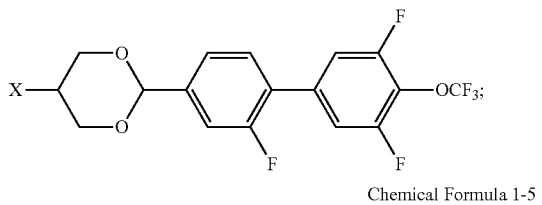

Chemical Formula 1-5
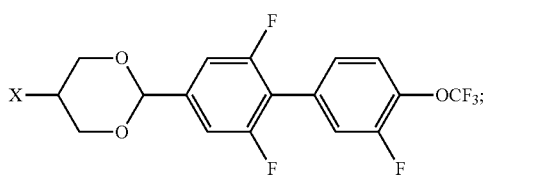

Chemical Formula 1-6
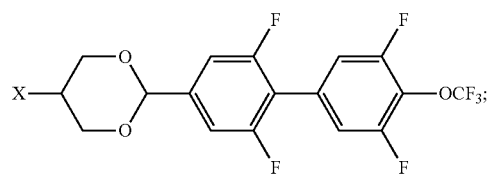

Chemical Formula 2-1
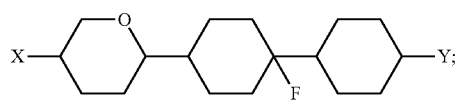

Chemical Formula 2-2
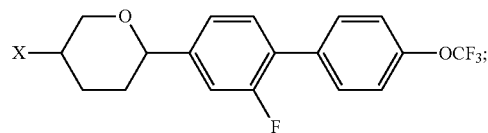

Chemical Formula 2-3
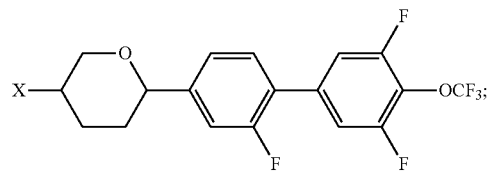

Chemical Formula 2-4
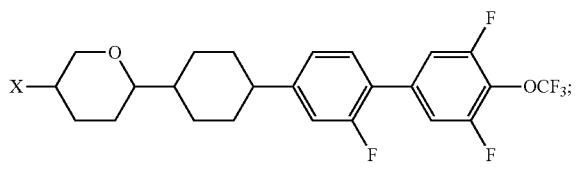

Chemical Formula 2-5
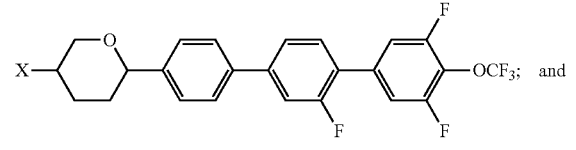

Chemical Formula 2-6
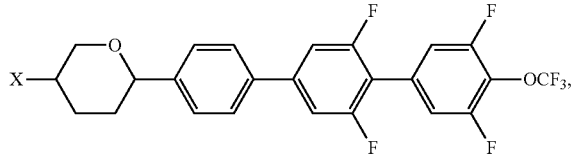

where, in Chemical Formulas 1-1 to 1-6 and Chemical Formulas 2-1 to 2-6 above, X and Y are each independently a $C_1$-$C_5$ alkyl group.

Hereinafter, an exemplary embodiment of the liquid crystal composition and physical properties thereof are described.

COMPARATIVE EXAMPLE
TABLE 2
| Liquid Crystal Compound | Content (wt %) |
|---|---|
| 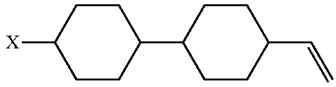 | 33 |
| 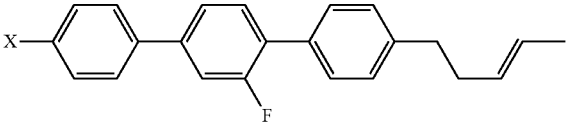 | 6 |
| 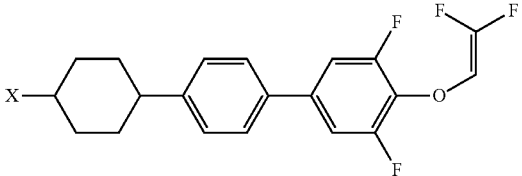 | 12 |
| 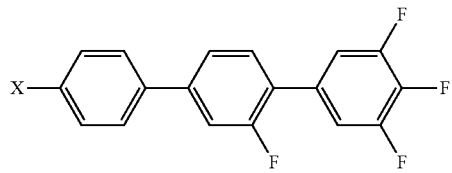 | 10.5 |
| 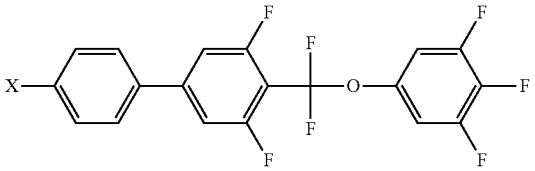 | 5 |
| 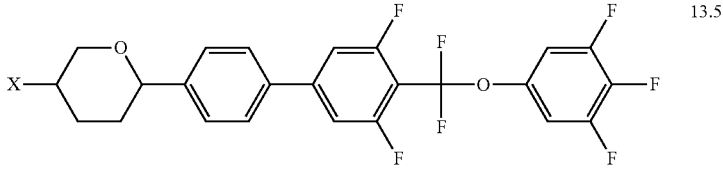 | 13.5 |
| 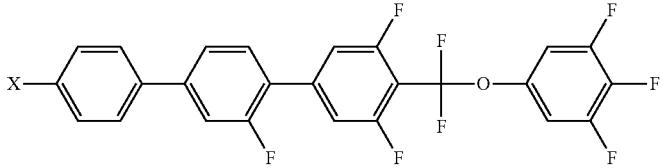 | 20 |

In Table 2 above, X and Y are each independently a $C_1$-$C_5$ alkyl group. The Comparative Examples do not include compounds represented by Chemical Formulas PI-1 to PI-4, but include compounds represented by Chemical Formulas A-1, A-6, A-8, P-8, P-9, 10, 11, among the liquid crystal molecules according to an exemplary embodiment of the present invention. For the evaluation results of the physical properties of these Comparative Examples, the glass transition temperature (Tni) ranged from 74 degrees Celsius to 75 degrees Celsius, the refractive index (Δn) ranged from about 0.13 to about 0.15, the dielectric anisotropy (Δε) ranged from about 17.8 to 18.2, and the rotation viscosity (γ1) ranged from about 90 to about 100 millipascal-second (mPa-s).

EXAMPLE 1

TABLE 3

| Liquid Crystal Compound | Content (wt %) |
| --- | --- |
| | 15 |
| | 7 |
| | 8 |
| | 7.5 |
| | 4 |
| | 6.5 |
| | 5 |
| | 3 |
| | 10.5 |

TABLE 3-continued

| Liquid Crystal Compound | Content (wt %) |
|---|---|
| 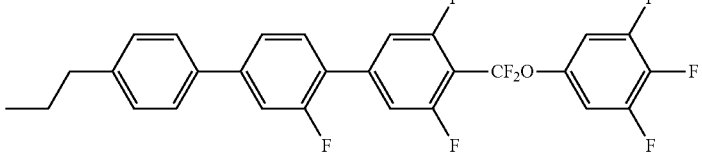 | 5 |
| 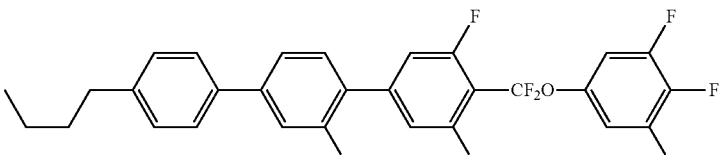 | 7 |
| 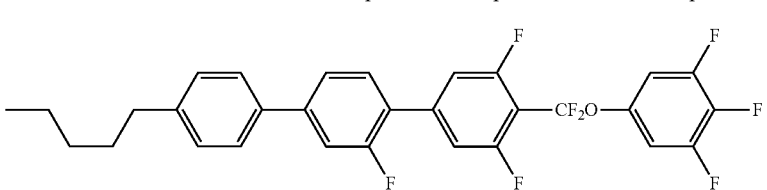 | 8 |
| 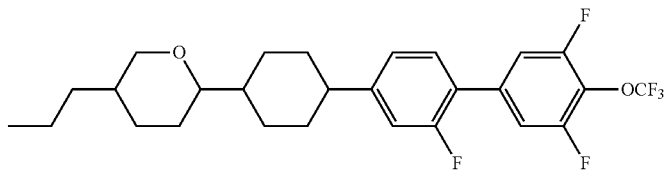 [SMILES: CCCC1CCC(C2CCC(c3ccc(-c4cc(F)c(OC(F)(F)F)c(F)c4)c(F)c3)CC2)OC1] | 3.5 |
| 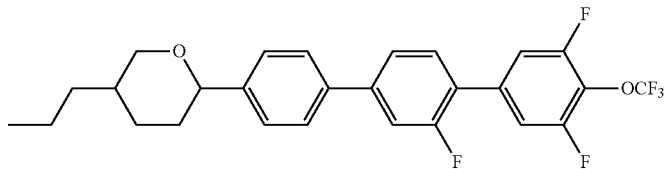 [SMILES: CCCC1CCC(c2ccc(-c3ccc(-c4cc(F)c(OC(F)(F)F)c(F)c4)c(F)c3)cc2)OC1] | 10 |
| Sum | 100 |

In Table 3 above, X and Y are each independently a $C_1$-$C_5$ alkyl group. Example 1 includes the liquid crystal molecules represented by Chemical Formulas 2-14 and 2-15 in an exemplary embodiment of the liquid crystal composition.

For the evaluation results of the physical properties of Example 1, the glass transition temperature (Tni) was 103.5 degrees Celsius, the refractive anisotropy (Δn) was 0.135, the rotation viscosity (γ1) was 121 mPa-s, and the dielectric anisotropy (Δε) was 16.2, and by adding 1,3-dioxane, the glass transition temperature of Example 1 increased relative to the Comparative Examples.

EXAMPLE 2

TABLE 4

| Liquid Crystal Compound | Content (wt %) |
|---|---|
| 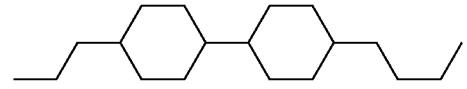 [SMILES: CCCCC1CCC(C2CCC(CCC)CC2)CC1] | 14 |
| 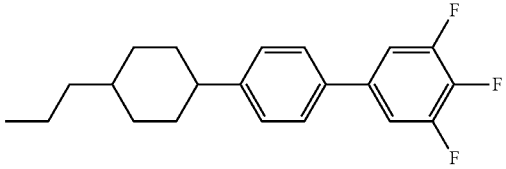 [SMILES: CCCC1CCC(c2ccc(-c3cc(F)c(F)c(F)c3)cc2)CC1] | 15 |

TABLE 4-continued

| Liquid Crystal Compound | Content (wt %) |
|---|---|
| [structure] | 13 |
| [structure] | 12 |
| [structure] | 12 |
| [structure] | 9 |
| [structure] | 9 |
| [structure] | 3 |
| [structure] | 3 |
| [structure] | 5 |
| [structure] | 5 |
| Sum | 100 |

In Table 4 above, X and Y are each independently a $C_1$-$C_5$ alkyl group. Example 2 includes the liquid crystal molecules represented by Chemical Formulas 1-16 and 2-16 in an exemplary embodiment of the liquid crystal composition.

For the evaluation results of the physical properties of Example 2, the glass transition temperature (Tni) was 112.3 degrees Celsius, the refractive anisotropy (Δn) was 0.12, the rotation viscosity (γ1) was 168 mPa-s, and the dielectric anisotropy (Δε) was 8.73, and by adding 1,3-dioxane and tetrahydropyran, the glass transition temperature of Example 2 was increased relative to the Comparative Examples, and the rotation viscosity could be maintained to be at 200 mPa-s or less.

EXAMPLE 3

TABLE 5

| Liquid Crystal Compound | Content (wt %) |
|---|---|
| 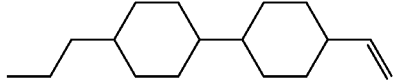 | 18 |
| 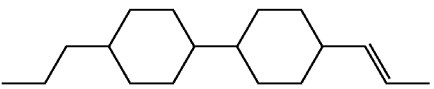 [SMILES: C/C=C/C1CCC(C2CCC(CCC)CC2)CC1] | 9 |
| 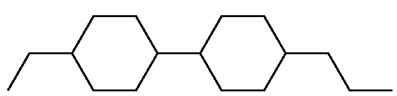 [SMILES: CCCC1CCC(C2CCC(CC)CC2)CC1] | 8 |
| 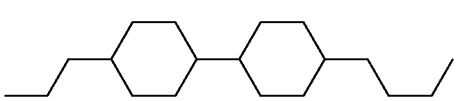 [SMILES: CCCCC1CCC(C2CCC(CCC)CC2)CC1] | 7.5 |
| 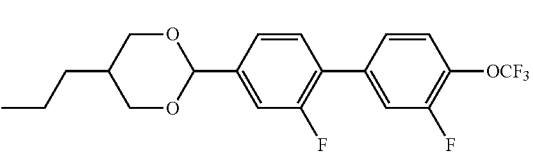 [SMILES: CCCC1COC(c2ccc(-c3ccc(OC(F)(F)F)c(F)c3)c(F)c2)OC1] | 5 |
| 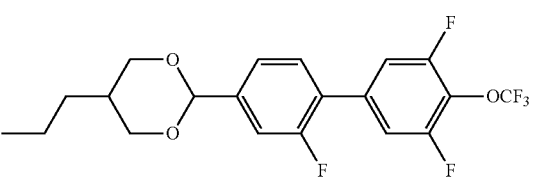 [SMILES: CCCC1COC(c2ccc(-c3cc(F)c(OC(F)(F)F)c(F)c3)c(F)c2)OC1] | 8.5 |
| 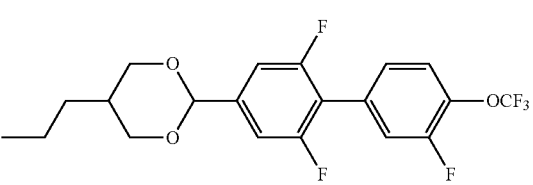 [SMILES: CCCC1COC(c2cc(F)c(-c3ccc(OC(F)(F)F)c(F)c3)c(F)c2)OC1] | 5 |
| 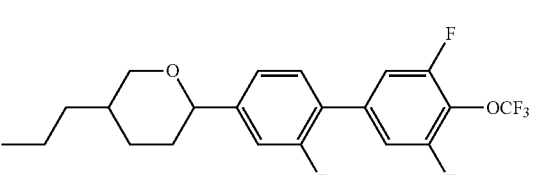 | 8.5 |
| 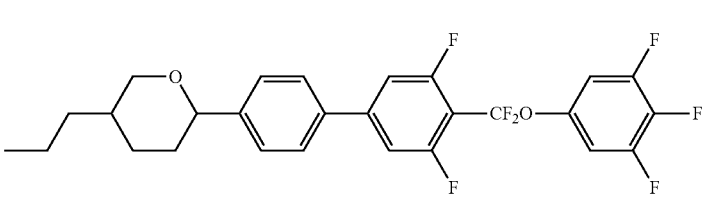 | 10.5 |

TABLE 5-continued

| Liquid Crystal Compound | Content (wt %) |
|---|---|
| 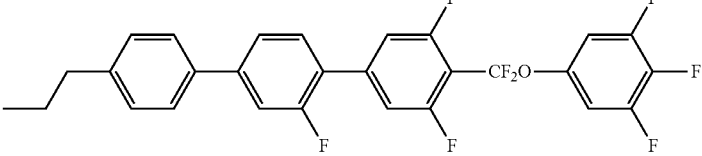 | 5 |
| 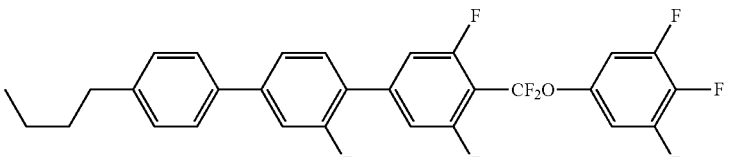 | 7 |
| 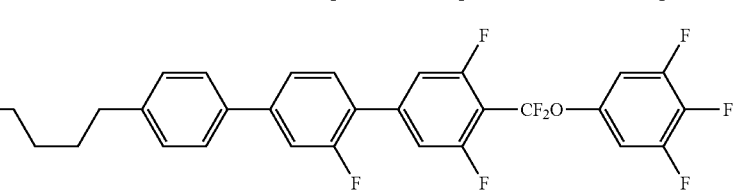 | 8 |
| Sum | 100 |

In Table 5 above, X and Y are each independently a $C_1$-$C_5$ alkyl group. Example 3 includes the liquid crystal molecules represented by Chemical Formulas 1-13, 1-14, 1-15 and 2-13 in an exemplary embodiment of the liquid crystal composition.

For the evaluation results of the physical properties of Example 3, the glass transition temperature (Tni) was 73.8 degrees Celsius, the refractive anisotropy ($\Delta n$) was 0.12, the rotation viscosity ($\gamma 1$) was 87 mPa-s, and the dielectric anisotropy ($\Delta \epsilon$) was 17.4, and by adding 1,3-dioxane and tetrahydropyran, an increase in the viscosity of Example 3 was minimized relative to the Comparative Examples, such that the response speed could be maintained.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal composition comprising:
   at least one liquid crystal molecule represented by Chemical Formulas 1-1 to 1-6 below, and at least one liquid crystal molecule represented by Chemical Formulas 2-1 to 2-6 below:

Chemical Formula 1-1
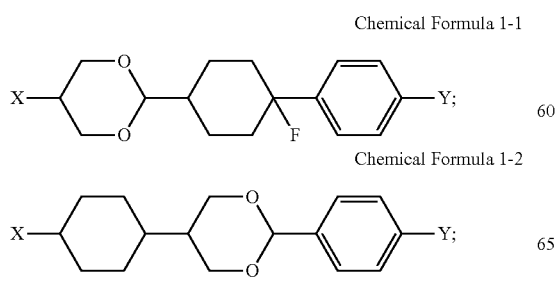

Chemical Formula 1-2

Chemical Formula 1-3
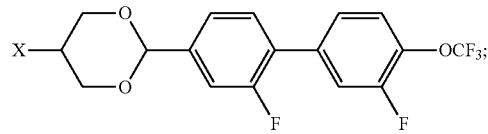

Chemical Formula 1-4
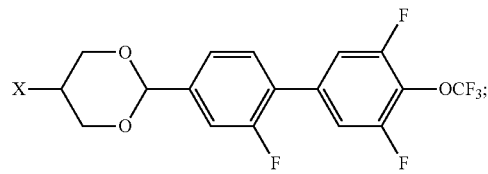

Chemical Formula 1-5
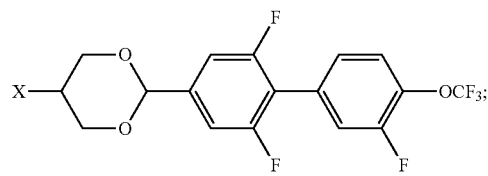

Chemical Formula 1-6
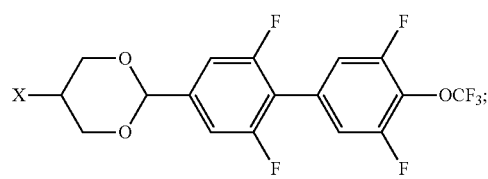

Chemical Formula 2-1
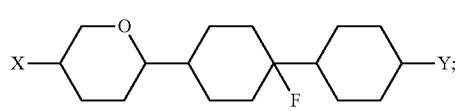

-continued

Chemical Formula 2-2
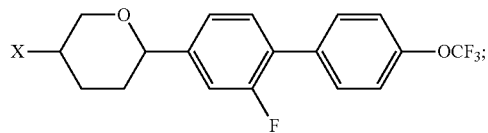

Chemical Formula 2-3
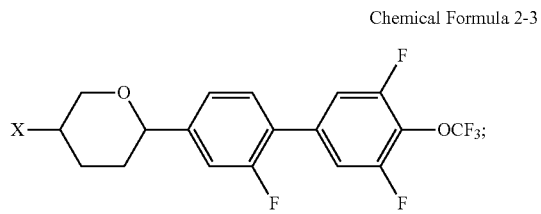

Chemical Formula 2-4
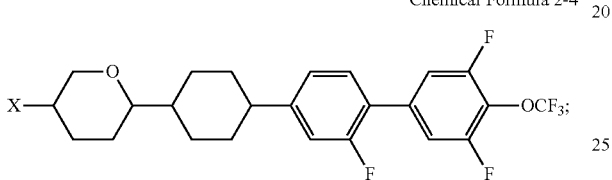

Chemical Formula 2-5
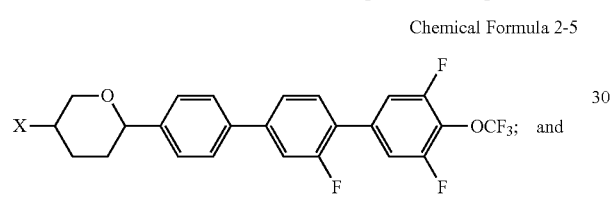

Chemical Formula 2-6
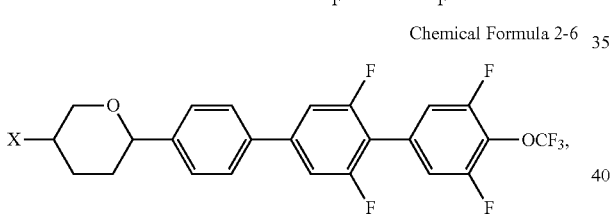

wherein, in Chemical Formulas 1-1 to 1-6 and Chemical Formulas 2-1 to 2-6 above, X and Y are each independently a $C_1$-$C_5$ alkyl group.

2. The liquid crystal composition of claim 1, wherein the liquid crystal molecules represented by Chemical Formulas 1-1 to 1-6 and the liquid crystal molecules represented by Chemical Formulas 2-1 to 2-6 are liquid crystal molecules represented by Chemical Formulas 1-11 to 1-16 below and liquid crystal molecules represented by Chemical Formulas 2-11 to 2-16 below, respectively:

Chemical Formula 1-11

Chemical Formula 1-12
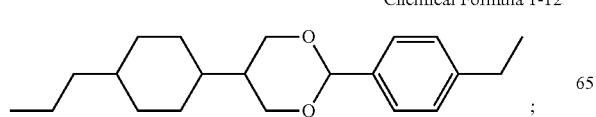

-continued

Chemical Formula 1-13
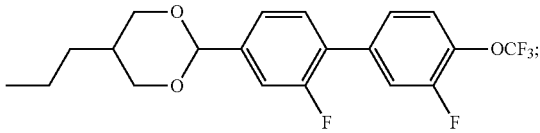

Chemical Formula 1-14
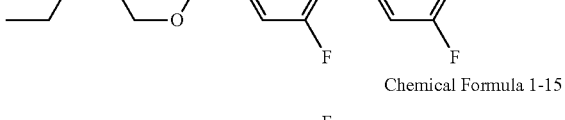

Chemical Formula 1-15
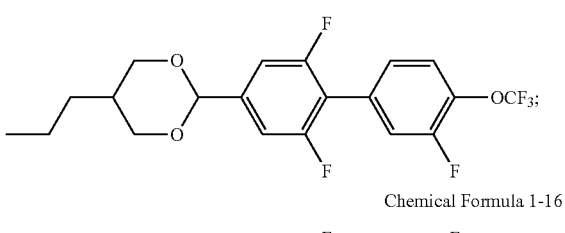

Chemical Formula 1-16
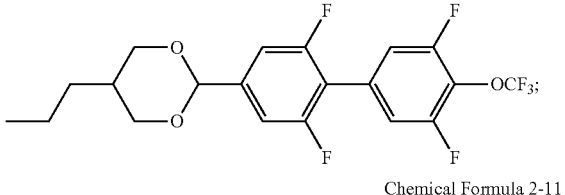

Chemical Formula 2-11
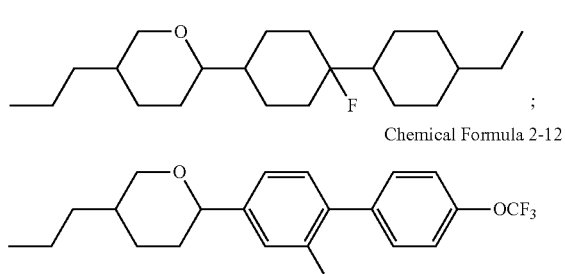

Chemical Formula 2-12

Chemical Formula 2-13
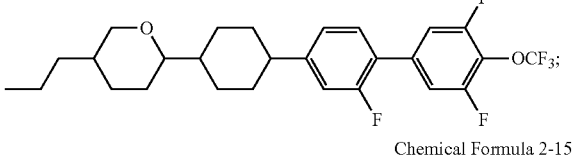

Chemical Formula 2-14

Chemical Formula 2-15
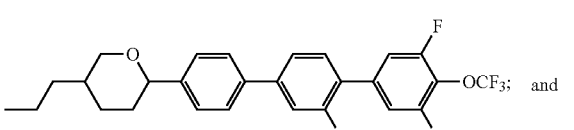

Chemical Formula 2-16

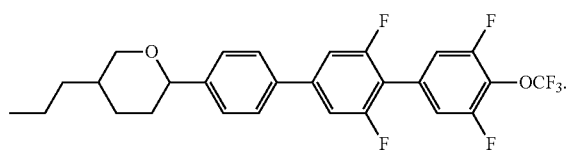

3. The liquid crystal composition of claim 2, further comprising at least one alkenyl-based liquid crystal molecule represented by Chemical Formulas A-1 to A-7 below:

Chemical Formula A-1

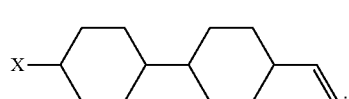

Chemical Formula A-2

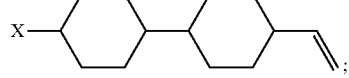

Chemical Formula A-3

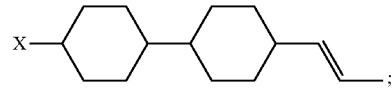

Chemical Formula A-4

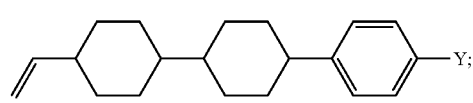

Chemical Formula A-5

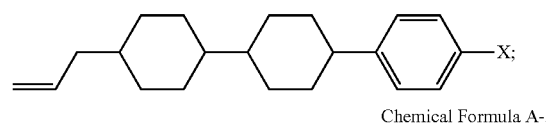

Chemical Formula A-6

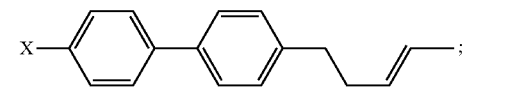

Chemical Formula A-7

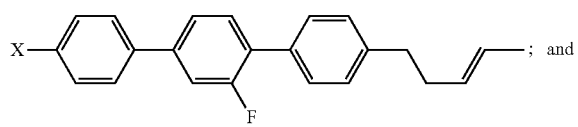

wherein, in Chemical Formulas A-1 to A-7 above, X and Y are each independently a $C_1$-$C_5$ alkyl group.

4. The liquid crystal composition of claim 3, further comprising at least one neutral liquid crystal molecule represented by Chemical Formulas N-1 to N-7 below:

Chemical Formula N-1

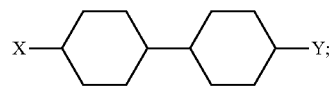

Chemical Formula N-2

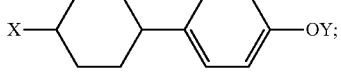

Chemical Formula N-3

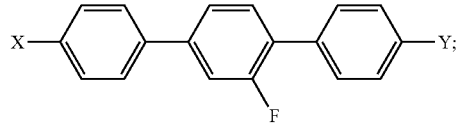

Chemical Formula N-4

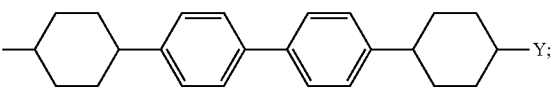

Chemical Formula N-5

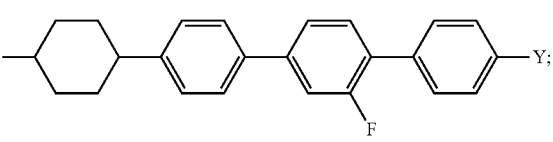

Chemical Formula N-6

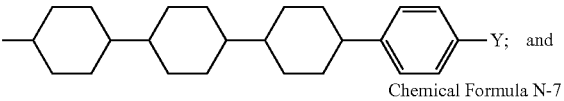

Chemical Formula N-7

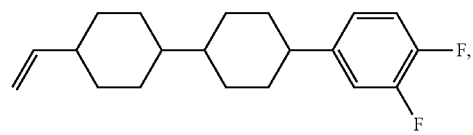

wherein, in Chemical Formulas N-1 to N-7 above, X and Y are each independently a $C_1$-$C_5$ alkyl group.

5. The liquid crystal composition of claim 4, further comprising at least one polar liquid crystal molecule represented by Chemical Formulas P-1 to P-12 below:

Chemical Formula P-1

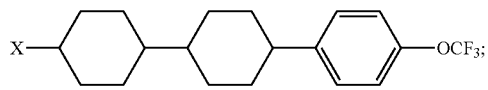

Chemical Formula P-2

Chemical Formula P-3

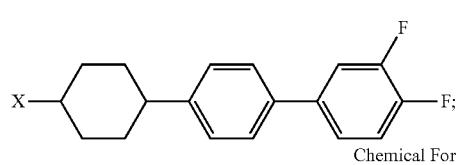

Chemical Formula P-4

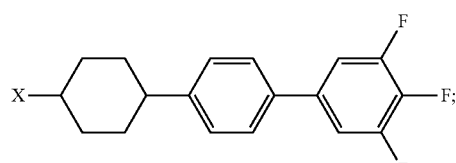

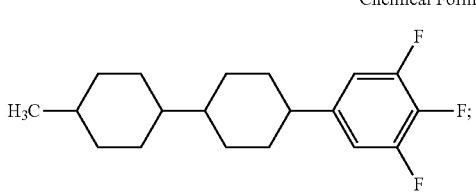

-continued

Chemical Formula P-5
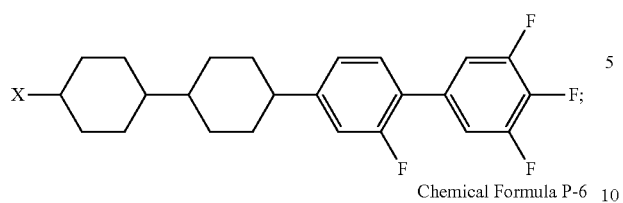

Chemical Formula P-6
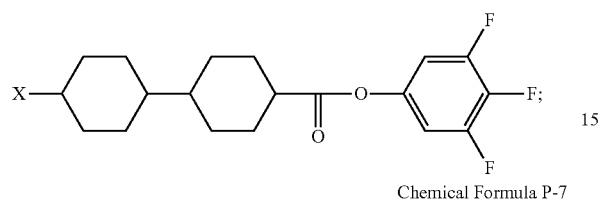

Chemical Formula P-7
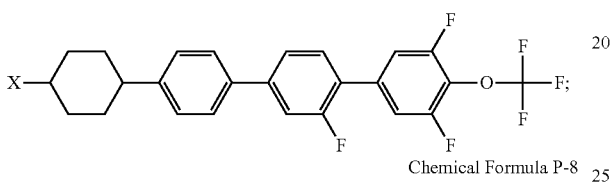

Chemical Formula P-8
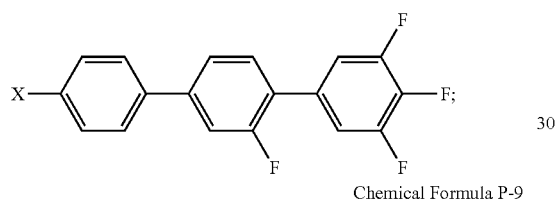

Chemical Formula P-9
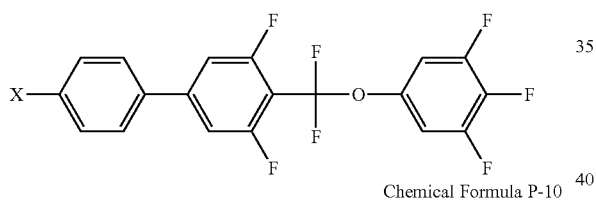

Chemical Formula P-10
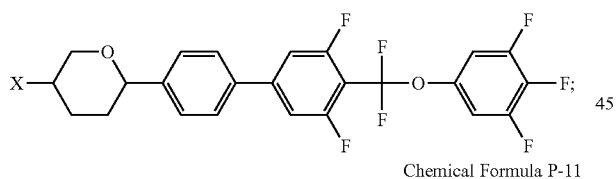

Chemical Formula P-11
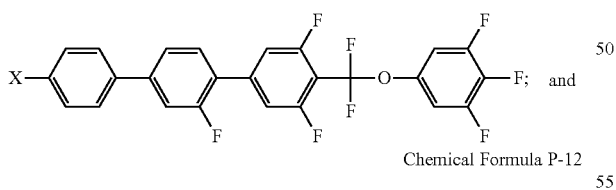

Chemical Formula P-12
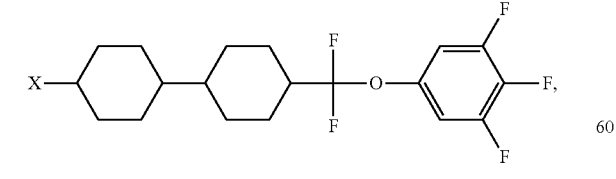

wherein, in Chemical Formulas P-1 to P-12 above, X and Y are each independently a $C_1$-$C_5$ alkyl group.

6. The liquid crystal composition of claim 5, wherein at least one liquid crystal molecule represented by Chemical Formulas 1-1 to 1-6, and at least one liquid crystal molecule represented by Chemical Formulas 2-1 to 2-6 is present in an amount about 1 weight percent to about 20 weight percent, based on the total weight of the liquid crystal composition.

7. A liquid crystal display comprising:
a first substrate;
a first electrode and a second electrode positioned on the first substrate, with an insulating layer interposed therebetween;
a second substrate facing the first substrate; and
a liquid crystal layer positioned between the first substrate and the second substrate,
wherein the liquid crystal layer comprises at least one liquid crystal molecule represented by Chemical Formulas 1-1 to 1-6 below, and at least one liquid crystal molecule represented by Chemical Formulas 2-1 to 2-6 below:

Chemical Formula 1-1

Chemical Formula 1-2
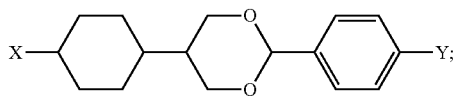

Chemical Formula 1-3
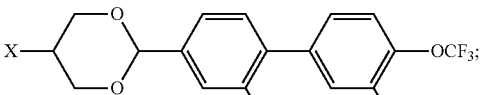

Chemical Formula 1-4

Chemical Formula 1-5
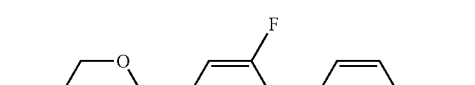

Chemical Formula 1-6
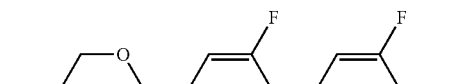

Chemical Formula 2-1
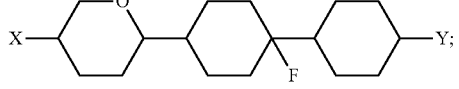

Chemical Formula 2-2

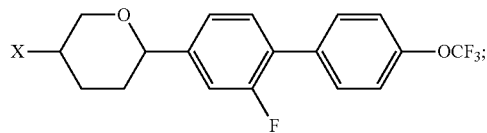

Chemical Formula 2-3

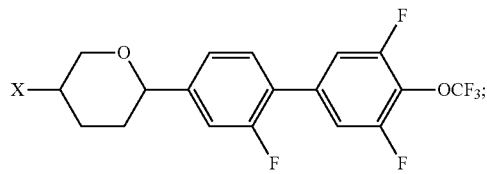

Chemical Formula 2-4

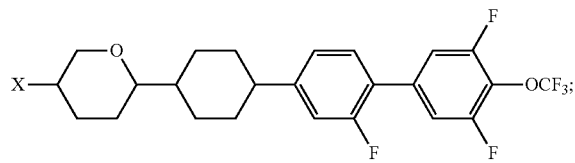

Chemical Formula 2-5

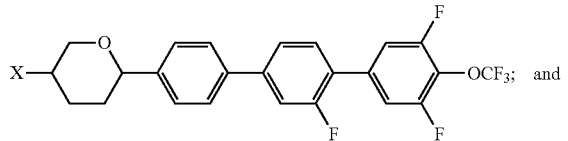     and

Chemical Formula 2-6

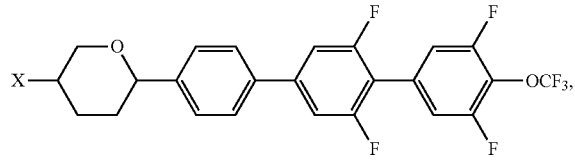, wherein, in Chemical Formulas 1-1 to 1-6 and Chemical Formulas 2-1 to 2-6 above, X and Y are each independently a $C_1$-$C_5$ alkyl group.

8. The liquid crystal display of claim 7, wherein the liquid crystal molecules represented by Chemical Formulas 1-1 to 1-6 and the liquid crystal molecules represented by Chemical Formulas 2-1 to 2-6 are liquid crystal molecules represented by Chemical Formulas 1-11 to 1-16 below and liquid crystal molecules represented by Chemical Formulas 2-11 to 2-16 below, respectively:

Chemical Formula 1-11

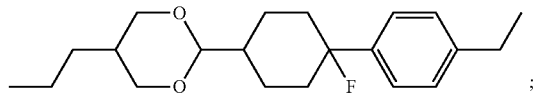

Chemical Formula 1-12

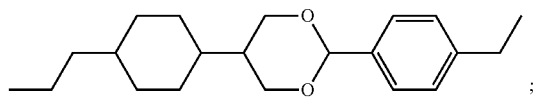

Chemical Formula 1-13

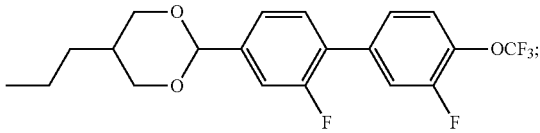

Chemical Formula 1-14

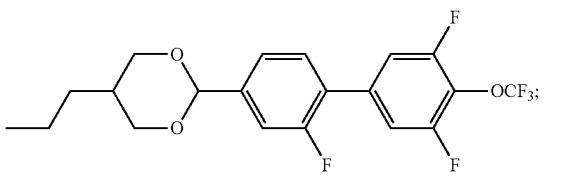

Chemical Formula 1-15

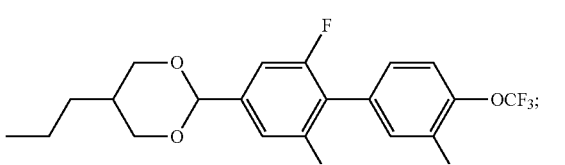

Chemical Formula 1-16

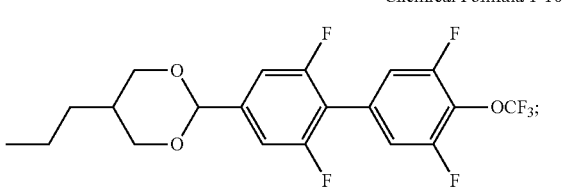

Chemical Formula 2-11

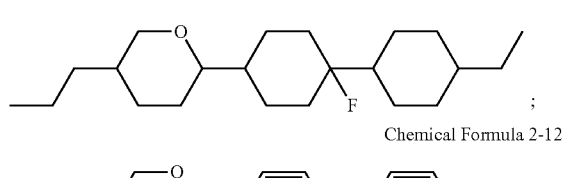

Chemical Formula 2-12

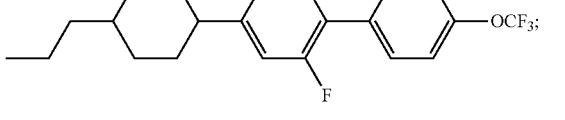

Chemical Formula 2-13

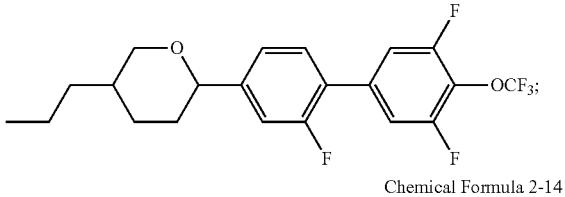

Chemical Formula 2-14

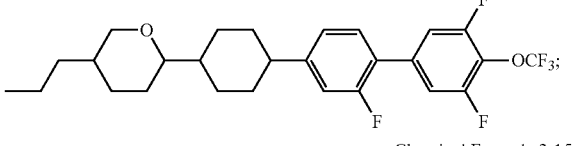

Chemical Formula 2-15

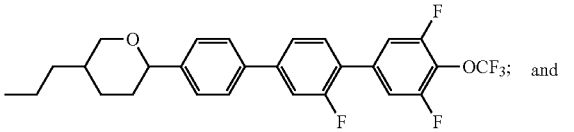     and

Chemical Formula 2-16

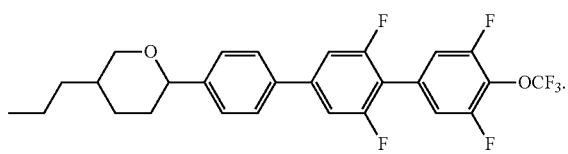

9. The liquid crystal display of claim 8, wherein the liquid crystal layer further comprises at least one alkenyl-based liquid crystal molecule represented by Chemical Formulas A-1 to A-7 below:

Chemical Formula A-1
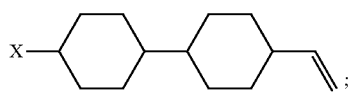

Chemical Formula A-2
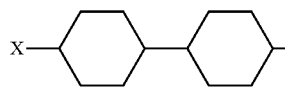

Chemical Formula A-3
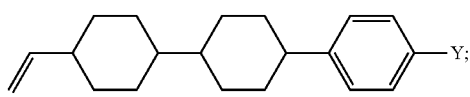

Chemical Formula A-4
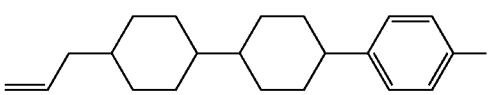

Chemical Formula A-5
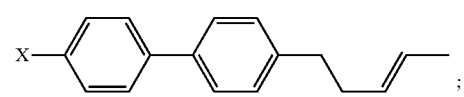

Chemical Formula A-6
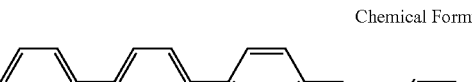
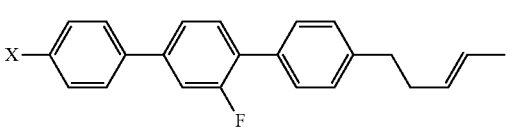

Chemical Formula A-7
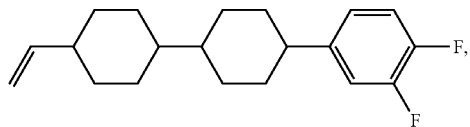

wherein, in Chemical Formulas A-1 to A-7 above, X and Y are each independently a $C_1$-$C_5$ alkyl group.

10. The liquid crystal display of claim 9, wherein the liquid crystal layer further comprises at least one neutral liquid crystal molecule represented by Chemical Formulas N-1 to N-7 below:

Chemical Formula N-1
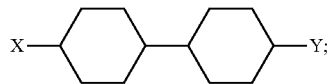

Chemical Formula N-2
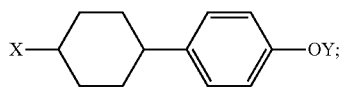

Chemical Formula N-3
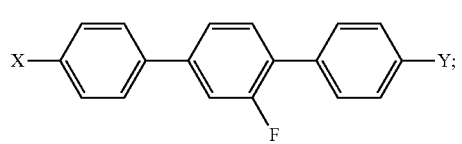

Chemical Formula N-4
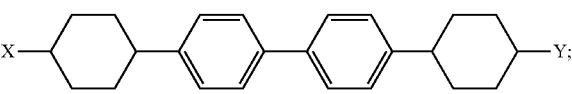

Chemical Formula N-5
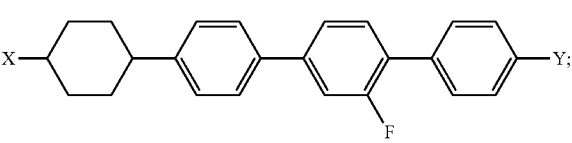

Chemical Formula N-6
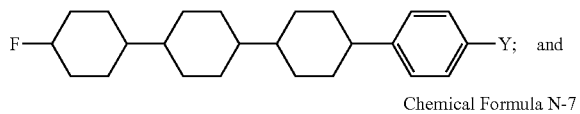

Chemical Formula N-7
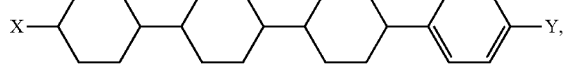

wherein, in Chemical Formulas N-1 to N-7 above, X and Y are each independently a $C_1$-$C_5$ alkyl group.

11. The liquid crystal display of claim 10, wherein the liquid crystal layer further includes at least one polar liquid crystal molecule represented by Chemical Formulas P-1 to P-12 below:

Chemical Formula P-1
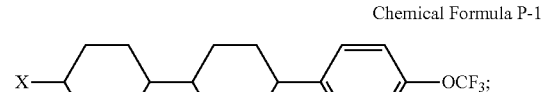

Chemical Formula P-2

Chemical Formula P-3
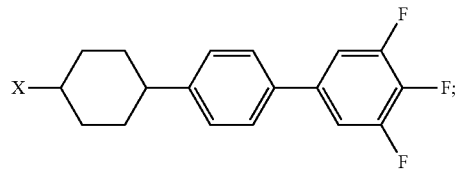

Chemical Formula P-4

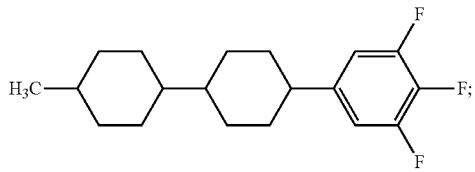

Chemical Formula P-5

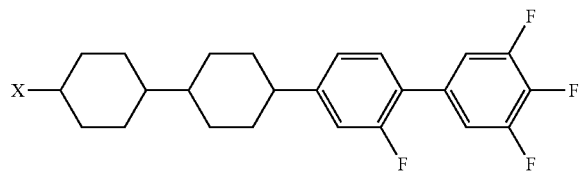

Chemical Formula P-6

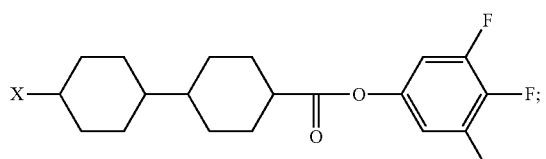

Chemical Formula P-7

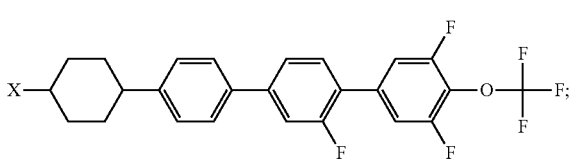

Chemical Formula P-8

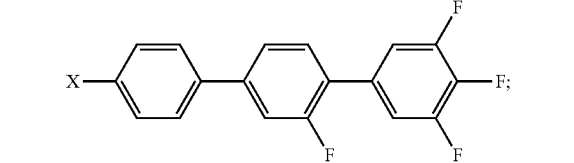

Chemical Formula P-9

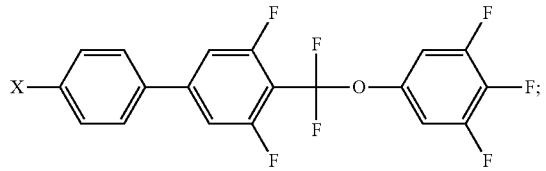

Chemical Formula P-10

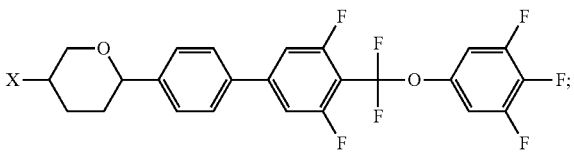

Chemical Formula P-11

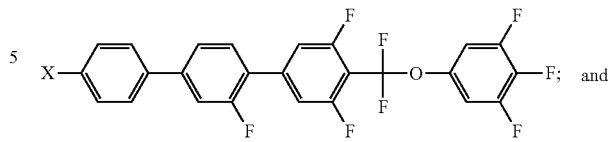

Chemical Formula P-12

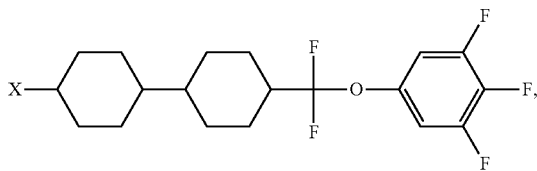

wherein, in Chemical Formulas P-1 to P-12 above, X and Y are each independently a $C_1$-$C_5$ alkyl group.

12. The liquid crystal display of claim 11, wherein at least one liquid crystal molecule represented by Chemical Formulas 1-1 to 1-6, and at least one of the liquid crystal molecule represented by Chemical Formulas 2-1 to 2-6 is present in an amount of about 1 weight percent to about 20 weight percent, based on the total weight of the liquid crystal composition.

13. The liquid crystal display of claim 7, wherein the insulating layer is positioned on the first electrode, the second electrode is positioned on the insulating layer, the first electrode has an integrated plate shape, and the second electrode includes a plurality of branch electrodes.

14. The liquid crystal display of claim 13, wherein the plurality of branch electrodes are overlapped with the first electrode in an integrated plate shape.

15. The liquid crystal display of claim 14, wherein the second electrode is connected to a thin film transistor by a contact hole penetrating the insulating layer.

16. The liquid crystal display of claim 15, wherein the liquid crystal molecules included in the liquid crystal layer are tilted in a direction parallel to the branch electrodes when an electric field is not applied to the liquid crystal layer.

17. The liquid crystal display of claim 16, further comprising alignment layers positioned on the second electrode and rubbed in a direction parallel to the branch electrodes.

18. The liquid crystal display of claim 16, wherein the liquid crystal molecules are tilted in a direction horizontal to an electric field when the electric field is applied to the liquid crystal layer.

19. The liquid crystal display of claim 13, wherein the first electrode has an integrated plate shape in a portion corresponding to unit pixels.

* * * * *